United States Patent
Todd et al.

(10) Patent No.: US 10,956,371 B2
(45) Date of Patent: Mar. 23, 2021

(54) TEAM FOLDER CONVERSION AND MANAGEMENT

(71) Applicant: Hitachi Vantara LLC, Santa Clara, CA (US)

(72) Inventors: Andrew Todd, Watertown, MA (US); Walter Wohler, Waltham, MA (US); Marty Kulma, Auburn, MA (US)

(73) Assignee: HITACHI VANTARA LLC, Santa Clara, CA (US)

( * ) Notice: Subject to any disclaimer, the term of this patent is extended or adjusted under 35 U.S.C. 154(b) by 333 days.

(21) Appl. No.: 15/773,569

(22) PCT Filed: Dec. 15, 2015

(86) PCT No.: PCT/US2015/065666
§ 371 (c)(1),
(2) Date: May 4, 2018

(87) PCT Pub. No.: WO2017/105400
PCT Pub. Date: Jun. 22, 2017

(65) Prior Publication Data
US 2018/0322137 A1 Nov. 8, 2018

(51) Int. Cl.
*G06F 16/176* (2019.01)
*G06F 16/11* (2019.01)
(Continued)

(52) U.S. Cl.
CPC .......... *G06F 16/176* (2019.01); *G06F 9/5016* (2013.01); *G06F 16/116* (2019.01); *G06F 16/162* (2019.01); *G06F 16/178* (2019.01)

(58) Field of Classification Search
None
See application file for complete search history.

(56) References Cited

U.S. PATENT DOCUMENTS 6,260,040 B1 7/2001 Kauffman et al.
6,697,846 B1 2/2004 Soltis
(Continued)

FOREIGN PATENT DOCUMENTS

EP     1 517 260 A2    3/2005

OTHER PUBLICATIONS

International Search Report of PCT/US2015/065666 dated Mar. 17, 2016.
(Continued)

*Primary Examiner* — Aleksandr Kerzhner
*Assistant Examiner* — Eddy Cheung
(74) *Attorney, Agent, or Firm* — Mattingly & Malur, PC

(57) ABSTRACT

In some examples, a system may receive, from a first user, a request to create a team folder from a folder associated with the first user. The request may indicate a requested storage quota from a team folder storage pool to associate with the team folder. The system may determine whether the requested storage quota is below a threshold amount corresponding to a profile for team folder creation associated with the first user. If the requested storage quota is below the threshold amount, the system may automatically create a shared file system for the team folder and allocate a quantity of storage from the team folder storage pool to the shared file system based on the requested storage quota. Alternatively, if the requested storage quota exceeds the threshold amount, the system may generate a communication to an administrator to request approval for creation of the team folder.

20 Claims, 14 Drawing Sheets

(51) Int. Cl.
*G06F 16/16* (2019.01)
*G06F 16/178* (2019.01)
*G06F 9/50* (2006.01)

(56) References Cited

U.S. PATENT DOCUMENTS

| | | |
|---|---|---|
| 2005/0256909 A1 | 11/2005 | Aboulhosn et al. |
| 2007/0130143 A1 | 6/2007 | Zhang et al. |
| 2012/0226855 A1 | 9/2012 | Dhuse |
| 2014/0258418 A1 | 9/2014 | Subramani et al. |
| 2015/0033224 A1 | 1/2015 | Maheshwari et al. |
| 2015/0156274 A1 | 6/2015 | Alten |

OTHER PUBLICATIONS

Extended European Search Report received in corresponding European Application No. 15910881.0 dated Jul. 24, 2019.

TEAM FOLDER CONVERSION AND MANAGEMENT

TECHNICAL FIELD

This disclosure relates to the technical field of data storage, including providing team folder functionality.

BACKGROUND

When a user wants to create a team folder in a conventional file synchronization and sharing computer system, the user typically has to provide specific information to an administrator of the system and request that the administrator create the team folder. When there are a large number of users, manually transmitting information outside of the system to an administrator can be cumbersome and error prone. For instance, the user may have to exit a team folder creation workflow and interact with a third party system, resulting in loss of context and a degraded user experience. Furthermore, tracking the request and approval or denial of the request may include the use of third party software, which can cause difficulties with auditing, security, and management of user requests. Additionally, dealing with a large number of users as well as a large number of requests may be cumbersome for a small administrative team.

In addition, following creation of a team folder, problems may arise from users who either maliciously or accidentally delete team folders, which may result in loss of data for all of the members of the team folder. Addressing such problems may also increase the burden on the administrators.

SUMMARY

Some implementations include techniques and arrangements for automatically creating team folders in a computer system in response to receiving a team folder creation request from a user. For example, a service computing device may receive, from a client device associated with a first user, a request to create a team folder from a folder associated with the first user. The request may indicate a requested storage quota to associate with the team folder from a team folder storage pool. The service computing device may determine whether the requested storage quota is below a threshold amount corresponding to a profile for team folder creation associated with the first user. Based at least in part on determining that the requested storage quota is below the threshold amount, the service computing device may create a shared file system for the team folder, and may allocate a quantity of storage from the team folder storage pool to the shared file system based on the requested storage quota. Alternatively, based at least in part on determining that the requested storage quota exceeds the threshold amount, the service computing device may generate a communication to an administrator computing device associated with an administrator to ask approval for creation of the team folder. If approval is received, the service computing device may proceed with creation of the team folder.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DESCRIPTION OF THE EMBODIMENTS

Figure 1:
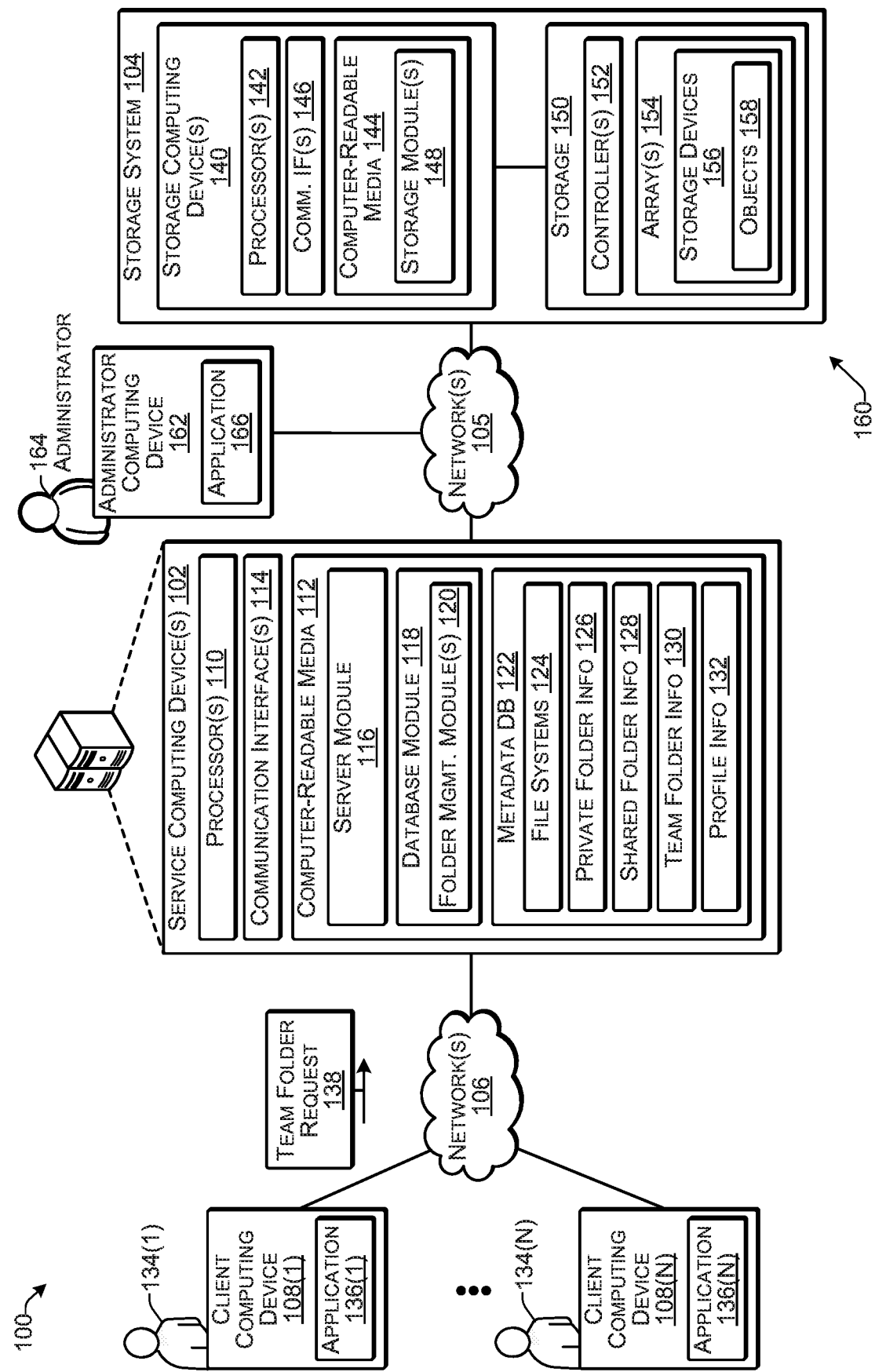
FIG. 1 illustrates an example architecture of a system configured to enable team folder creation and management according to some implementations.

Some implementations herein are directed to techniques and arrangements for creating and managing team folders in a computer system. For instance, the system may receive a team folder creation request from a user, and may automatically determine whether to approve the request or forward the request to an administrator for further review. As one example, the creation request for the team folder may be granted based on the particular user being associated with a profile that was previously configured by the administrator. In some examples, such as when the request is not granted automatically, the request may be persisted in the system as part of a request queue upon which the administrator can view and act. The system may be configured to send creation requests for team folders to third-party systems in order to notify an administrator, such as via email or other communication systems. The administrator is able to approve, change, or reject team folder requests from the queue. Further, the team folder request may be logged automatically for auditing purposes on creation and resolution. In some cases, administrators may delegate request approval to non-administrative users. The system may further provide an administrator user interface to enable an administrator to set profile settings for team folders and also set other parameters for team folders.

In some examples herein, there may be at least three different types of folders, namely private folders, shared folders, and team folders. A private folder may be a folder that is owned by and can solely be accessed by a particular user. The private folder may exist in the particular user's private file system. The storage consumed by the objects (e.g., files) stored in the private folder may count toward the user's storage quota. Additionally, a shared folder may be a folder that is owned by one user but is accessed by one or more users. The shared folder may exist in its own file system. However, the storage consumed by the objects stored in the shared folder counts toward the owner's storage quota.

A team folder may be a folder that is not owned by any user, but which may be accessed and managed by one or more users. The team folder may exist in its own file system. The storage capacity consumed by the objects stored in the team folder counts against a storage quota defined for the team folder, rather than counting against the storage capacity of any particular user. Thus, team folders may typically be used by a group of uses for collaborative purposes, such as for advancing a common goal of a team of users.

The techniques herein for generating a request for a team folder enable users to maintain their current context while creating a team folder, without leaving the computer system. The persisted approval request queue and automated notifications to administrators and requesters can prevent erroneous or missing requests. Furthermore, the logging function herein may provide a full audit trail from the generation of a request to the final approval and creation of the team folder. Delegation of request approval allows smaller administrative teams to handle larger user bases without exposing access to the administrative console to general users.

In some examples, the system allows a team folder to be placed in an abandoned state when deleted by a user having a manager role with respect to the team folder. The abandoned team folder may then be kept in the system for period of time based on a retention policy. During that period of time, the abandoned team folder may be restored by an administrator if a user submits a request to the administrator. Additionally, the abandoned team folder may be deleted manually by an administrator, or deleted automatically by the system following passage of a specified period of time based on the retention policy set by the administrator. When a team folder has been permanently deleted, the storage capacity associated with that team folder may be returned to a team folder storage pool.

To enable usage of team folders, the administrator allocates a designated quantity of storage to be used for team folders. For example, a pool of storage may be defined by the administrator from which team folders can be created. A storage pool of fixed size and size limitations of the size of individual team folders prevent over-utilization of backend storage by users creating team folders. As each team folder is created, a storage quota from the storage pool is specified for that team folder. The amount of that storage quota is then removed from the available storage pool for team folders. When all of the available storage in the storage pool has been allocated, team folders can no longer be created unless an administrator allocates additional storage capacity to the storage pool or permanently deletes a team folder, such by deleting a team folder that has been abandoned, or other team folder determined by the administrator.

Further, an individual user may have an associated profile. For example, the profile may be a mapping of functionality granted by the system to the individual users. In some examples, groups of users may have the same or similar profiles with the same or similar settings within the system. For example, the profiles herein may indicate whether particular users are able to create team folders, and if so, how large those team folders may be when created. Accordingly, users may be granted the ability to create team folders through their membership in a profile. The administrator may create a profile that contains, e.g., the user's active directory groups, security identity provider, or the like, and maps permissions to those users. The administrator may choose to allow the users that are included in the profile to administer their own team folders. If that permission is granted, the users who are members of the profile can have the ability to create team folders.

When a user logs into the system, the system determines the profile membership of the user. If the user is a member of a profile containing the "team folder administration" permission, then the system is configured to present the user with additional workflows for administering team folders.

The storage quota for a team folder may be configured on creation of the team folder. The administrator may set a threshold in the profile that prevents automatic creation of team folders having a storage capacity greater than the threshold. When a user tries to create a team folder greater than the threshold set in the profile with which the user is associated, the system may send a communication to the administrator requesting that the administrator override the threshold, or alternatively, reduce the requested storage quota for the request.

Conversion of any type of folder to a team folder may require the user to specify a desired storage capacity for the team folder. The user may also specify a team folder contact for system administrators. Further, the user may specify one or more users to invite to have access to the team folder. In addition, the user may specify the roles that the invited users may have with respect to the team folder, e.g., "viewer", "collaborator", or "manager". For example, a viewer may have read-only privileges for a specified shared folder or team folder; a collaborator may have read and write privileges for a specified shared folder or team folder; a manager may have read/write privileges and administrator privileges for a team folder (owners of shared folders are the only managers for shared folders).

If a user selects one of the user's private folders to convert to a team folder, and the storage quota for the team folder is less than the configured threshold in the profile, then the request may be automatically approved and a team folder is created automatically. For instance, the computer system may create a new file system for use as the team folder. Further, the computer system may copy metadata from the private folder into the new team folder (i.e., the new file system). In addition, the system may send invitations to the specified users that are invited to have access to the new team folder. Following creation of the team folder, the original private folder of the user may be deleted from the user's private file system and a pointer (e.g., a mount record) to the team folder may be created in the user's private file system in place of the deleted private folder. Accordingly, the user may select the pointer to access the team folder.

Alternatively, rather than converting a private folder, the user may select one of the user's own shared folders to convert to a team folder. Only the owner of a shared folder may request conversion of a shared folder to a team folder. If the storage quota requested by the user for the team folder is below the configured threshold in the profile, the system may automatically approve the request and may convert automatically the shared folder directly to a team folder. For example, to convert a shared folder to a team folder, the computer system may create a new file system for the team folder. In addition, the system may copy metadata from the shared folder's file system to the team folder's file system.

Further, the members of the shared folder may be made automatically members of the team folder. The pointer to the shared folder file system in each member user's private file system may be replaced with a pointer to the team folder file system. The shared folder file system may then be marked for deletion or otherwise indicated to be abandoned.

As another example, suppose that a user attempting to create a team folder requests a storage quota that is above the configured threshold size limit. In this case, the request is not automatically approved and the creation of the team folder does not happen immediately. Instead, the system places the request into a request queue that is provided to the system administrators. For instance, a notification email or other communication may be sent to an administrator to inform the administrator that there is a pending request that needs attention. As one example, if the team folder request is for conversion of a private folder into a team folder, a shared folder may be created temporarily instead of a team folder. The invitees listed in the team folder creation request are invited to join the shared folder. Thus, the automatic creation of the shared folder allows the users to begin collaborating while waiting for the request for the team folder to be placed in the request queue and acted on by an administrator. Following approval of the request, the shared folder may be converted by the system to a team folder and the existing members may be provided access automatically to the team folder. For example, the system may associate, with the team folder, membership information indicating members of the shared folder that are able to access the team folder.

The system administrators are able to view the queue of requests for team folders that are over the configured threshold for storage capacity. If an administrator approves a particular request, then the computer system may proceed with the folder conversions as described above. The system may then notify the requesting user and the invited members that the team folder request is approved. Alternatively, in the case in which the request is denied, the system may send a notification to the requesting user of the administrator's decision and the system takes no further action. As another example, the administrator may modify the request, such as by approving a storage quota for the team folder that is less than the amount requested by the requester. Should the administrator choose this option, the existing request may be canceled and conversion will take place as described above, but with the storage capacity amount specified by the administrator.

Following creation of the team folder, any user having team folder administration enabled in their profile and having a specified role of manager of the team folder may request that the storage quota of the team folder be changed. Similar to conversion requests, if a requested change to the storage capacity for a team folder asks for an amount of storage capacity that is less than the configured threshold, then the system may automatically approve the request. On the other hand, if the user asks for a storage capacity for the team folder that is greater than the configured threshold size, the system may place the request into the request queue and a communication may be sent to the system administrator to ask for approval of the request for a storage quota greater than the threshold setting. The communication in the request approval queue is handled as described above.

Any member of a team folder having team folder administration enabled in their profile and having a specified role of manager of the team folder may delete the team folder. When a user elects to delete the team folder, all members are removed from the team folder placing the team folder into an "abandoned" state. The abandoned state still allows for an administrator to recover a team folder, such as in the case that the deletion of the team folder is accidental or malicious. An abandoned team folder may be recovered by the administrator inviting a user into the team folder with the role of manager. The folder may then resume functioning as normal with all data intact. The administrator may alternatively choose to delete manually the team folder from the backend storage in some examples. Further, in some examples, a retention policy in the computer system may be configured by an administrator to cause automatic permanent deletion of abandoned team folders after passage of a configurable period of time.

For discussion purposes, some example implementations are described in the environment of computer system having one or more computing nodes in communication with a storage system. However, implementations herein are not limited to the particular examples provided, and may be extended to other types of computing systems, other types of storage environments, other system architectures, and so forth, as may be apparent to those of skill in the art in light of the disclosure herein.

FIG. 1 illustrates an example architecture of a system 100 configured to provide team folders according to some implementations. The system 100 includes a least one service computing device 102, also referred to herein as a node, that is able to communicate with, or is otherwise coupled to, a storage system 104, such as through one or more networks 105. Further, the service computing device 102 may be able to communicate over one or more networks 106 with one or more client computing devices 108, such as client computing devices 108(1)-108(N), or other types of client devices.

In some examples, the service computing device 102 may include one or more servers or other types of computing devices that may be embodied in any number of ways. For instance, in the case of a server, the modules, other functional components, and at least a portion of data storage may be implemented on at least one server, such as in a cluster of servers, a server farm or data center, a cloud-hosted computing service, and so forth, although other computer architectures may additionally or alternatively be used. In the illustrated example, the service computing device 102 includes, or may have associated therewith, one or more processors 110, one or more computer-readable media 112, and one or more communication interfaces 114.

Each processor 110 may be a single processing unit or a number of processing units, and may include single or multiple computing units, or multiple processing cores. The processor(s) 110 can be implemented as one or more central processing units, microprocessors, microcomputers, microcontrollers, digital signal processors, state machines, logic circuitries, and/or any devices that manipulate signals based on operational instructions. For instance, the processor(s) 110 may be one or more hardware processors and/or logic circuits of any suitable type specifically programmed or configured to execute the algorithms and processes described herein. The processor(s) 110 can be configured to fetch and execute computer-readable instructions stored in the computer-readable media 112, which can program the processor(s) 110 to perform the functions described herein.

The computer-readable media 112 may include volatile and nonvolatile memory and/or removable and non-removable media implemented in any type of technology for storage of information, such as computer-readable instructions, data structures, program modules, or other data. For example, the computer-readable media 112 may include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the service computing device 102, the computer-readable media 112 may be a tangible non-transitory medium to the extent that, when mentioned, non-transitory computer-readable media exclude media such as energy, carrier signals, electromagnetic waves, and/or signals per se. In some cases, the computer-readable media 112 may be at the same location as the service computing device 102, while in other examples, the computer-readable media 112 may be partially remote from the service computing device 102. For instance, in some cases, the computer-readable media 112 may include a portion of storage in the storage system 104.

The computer-readable media 112 may be used to store any number of functional components that are executable by the processor(s) 110. In many implementations, these functional components comprise instructions or programs that are executable by the processor(s) 110 and that, when executed, specifically program the processor(s) 110 to perform the actions attributed herein to the service computing device 102. Functional components stored in the computer-readable media 112 may include a server module 116, a database module 118 and one or more folder management modules 120, each of which may include one or more computer programs, applications, executable code, or portions thereof. For example, the server module 116 may provide communication functionality with the client computing devices 108 and the storage system 104. The database module 118 may include a database management program, for creating and managing a metadata database 122 containing metadata corresponding to data stored at the storage system 104. The folder management module(s) 120 may include instructions, algorithms and/or code described herein for creating and managing the team folders, as well as management of other types of folders by managing information included in the metadata database 122. For example, the folder management module(s) 120 may include executable instructions configured to cause the database module 118 to maintain the folder information as part of the metadata database 122 as well as perform the other functions described herein attributed to the service computing device 102 for creation and management of folders and associated file systems according to the algorithms and techniques described herein. Additional functional components stored in the computer-readable media 112 may include an operating system (not shown in FIG. 1) for controlling and managing various functions of the service computing device 102. In some cases, the functional components may be stored in a storage portion of the computer-readable media 112, loaded into a local memory portion of the computer-readable media 112, and executed by the one or more processors 110.

In addition, the computer-readable media 112 may store data and data structures used for performing the functions and services described herein. For example, the computer-readable media 112 may store the metadata database 122. In the illustrated example, the metadata database 122 includes a plurality of file systems 124. In some cases, individual file systems 124 may each correspond to one or more folders. In addition, the metadata database 122 may include other information that may be included in the file systems 124, or portions of which may be stored separately from the file systems 124. Examples of the other information may include private folder information 126, shared folder information 128, team folder information 130, and profile information 132. For example, the private folder information 126, shared folder information 128, and/or team folder information 130 may indicate storage capacity limits on the folders, which users have rights to access which folders, the roles of the users with respect to particular folders (e.g., owner, manager, collaborator, viewer), or the like. Further, the profile information 132 may include a mapping of functionality granted by the system and/or system administrators to the individual users and groups of users. The service computing device 102 may also include or maintain other functional components and data, which may include programs, drivers, etc., and the data used or generated by the functional components. Further, the service computing device 102 may include many other logical, programmatic, and physical components, of which those described above are merely examples that are related to the discussion herein.

The communication interface(s) 114 may include one or more interfaces and hardware components for enabling communication with various other devices, such as over the network(s) 105 and 106. Thus, the communication interfaces 114 may include, or may couple to, one or more ports that provide connection to the network(s) 105 for communicating with the storage system 104, and one or more ports that provide connection to the network(s) 106 for communication with the client computing devices 108. For example, the communication interface(s) 114 may enable communication through one or more of a LAN, the Internet, cable networks, cellular networks, wireless networks (e.g., Wi-Fi) and wired networks (e.g., Fibre Channel, fiber optic, Ethernet), direct connections, as well as close-range communications such as BLUETOOTH®, and the like, as additionally enumerated elsewhere herein.

Each client computing device 108 may be any suitable type of computing device such as a desktop, laptop, tablet computing device, mobile device, smart phone, wearable device, or any other type of computing device able to send data over a network. In some cases, the client computing devices 108 may include hardware configurations similar to that described for the service computing device 102, but with different data and functional components to enable them to perform the various functions discussed herein. Users 134(1)-134(N) may be associated with respective client computing devices 108(1)-108(N), such as through a user account, user login credentials, or the like. In some examples, the client computing devices 108 may access the service computing device 102 via an application server (not shown in FIG. 1), while in other examples, the client computing devices 108 may access the service computing device 102 directly. Furthermore, the client computing devices 108 may be able to communicate with the service computing device 102 through the one or more networks 106, through separate networks, or through any other suitable type of communication connection. Numerous other variations may be apparent to those of skill in the art having the benefit of the disclosure herein.

Further, each client computing device 108(1)-108(N) may include a respective instance of an application 136(1)-136(N) that may execute on the respective client computing device 108(1)-108(N), such as for communicating with the server module 116 and for sending user data for storage on the storage system 104. Further, the application 136 may be used by a user 134 for generating and sending a team folder request 138 for creation of a team folder to the service computing device 102. The team folder request 138 may include various information about the requested team folder, such as desired storage capacity, users to be invited to access the team folder, and the like. In some cases, the application 136 may include a browser or may operate through a browser, while in other cases, the application 136 may include any other type of application having communication functionality enabling communication over the one or more networks 106 with the server module 116. In some examples, individual users 134 may have multiple client computing devices 108, and the service computing device 102 may automatically synchronize a particular user's folders to each of the client devices 108 with which the particular user is associated.

The one or more networks 105 and 106 may include any suitable network, including a wide area network, such as the Internet; a local area network (LAN), such as an intranet; a wireless network, such as a cellular network, a local wireless network, such as Wi-Fi, and/or short-range wireless communications, such as BLUETOOTH®; a wired network including Fibre Channel, fiber optics, Ethernet, or any other such network, a direct wired connection, or any combination thereof. Accordingly, the one or more networks 105 and 106 may include both wired and/or wireless communication technologies. Components used for such communications can depend at least in part upon the type of network, the environment selected, or both. Protocols for communicating over such networks are well known and will not be discussed herein in detail. Accordingly, the service computing device 102 and client computing devices 108 are able to communicate over the one or more networks 106 using wired or wireless connections, and combinations thereof. Further, in some cases, a load balancing computing device (not shown in FIG. 1) may be located between the service computing device 102 and the client computing devices 108. Additionally, in some examples, the network 105 may be a LAN and the service computing device 102 and the storage system 104 may be located locally to each other.

The storage system 104 may include one or more storage computing devices 140, which may include one or more servers or any other suitable computing device, such as any of the examples discussed above with respect to the service computing device 102. The storage computing device(s) 140 may each include one or more processors 142, one or more computer-readable media 144, and one or more communication interfaces 146. For example, the processors 142 may correspond to any of the examples discussed above with respect to the processors 110, the computer-readable media 144 may correspond to any of the examples discussed above with respect to the computer-readable media 112, and the communication interfaces 146 may correspond to any of the examples discussed above with respect to the communication interfaces 114.

In addition, the computer-readable media 144 may include one or more storage modules 148 as functional components executed by the one or more processors 142 for managing the storage of data on a storage 150 included in the storage system 104. The storage 150 may include one or more controllers 152 associated with the storage 150 for storing data on one or more arrays 154 of storage devices 156. For instance, the controller 152 may control the array 154, such as for configuring the array 154 in a RAID configuration, or the like, and/or for presenting logical units based on the storage devices 156 to the storage module 148, and for managing data, such as objects 158, stored on the underlying physical storage devices 156. The storage devices 156 may be any type of storage device, such as hard disk drives, solid state drives, optical drives, magnetic tape, combinations thereof, and so forth. In some examples, the one or more arrays 154 may include a thin-provisioning array configured to provide on-demand storage capacity. Further, the storage 150 may be used to create a storage pool 160 to be used to provide storage capacity for team folders, as well as storage capacity for individual users.

In addition, the system 100 may include, or may be able to communicate with, an administrator computing device 162 associated with an administrator 164, such as through the one or more networks 105 and/or the one or more networks 106. For example, the administrator computing device 162 may include an application 166 that provides the administrator 164 with information about the service computing device(s) 102 and the storage system 104, and that provides one or more user interfaces to enable the administrator 164 to manage settings in the system, including profile settings, storage quota settings, and the like.

When a client computing device 108 sends a team folder request 138, the service computing device 102 may receive the team folder request 138 from the client device 108. In response to receiving the team folder request 138, the folder management module(s) 120 may parse the team folder request 138 to determine whether the request 138 conforms to the requirements for automatic creation of a team folder. If so, the folder management module(s) 120 may create a team folder in response to the request, which may include creating a new file system 124 corresponding to the new team folder, may store team folder information 130 about the new team folder, such as assigned storage capacity, users of the team folder, user roles, and the like, and may send invitations to users invited to access the team folder. On the other hand, if the team folder request 138 does not conform to the requirements for automatic creation of a team folder, the team folder request 138 may be added to a request approval queue (not shown in FIG. 1), and the administrator 164 may be sent a communication to obtain administrative review of the team folder request 138. Additional details of team folder creation, deletion, and management are discussed below.

Figure 2:
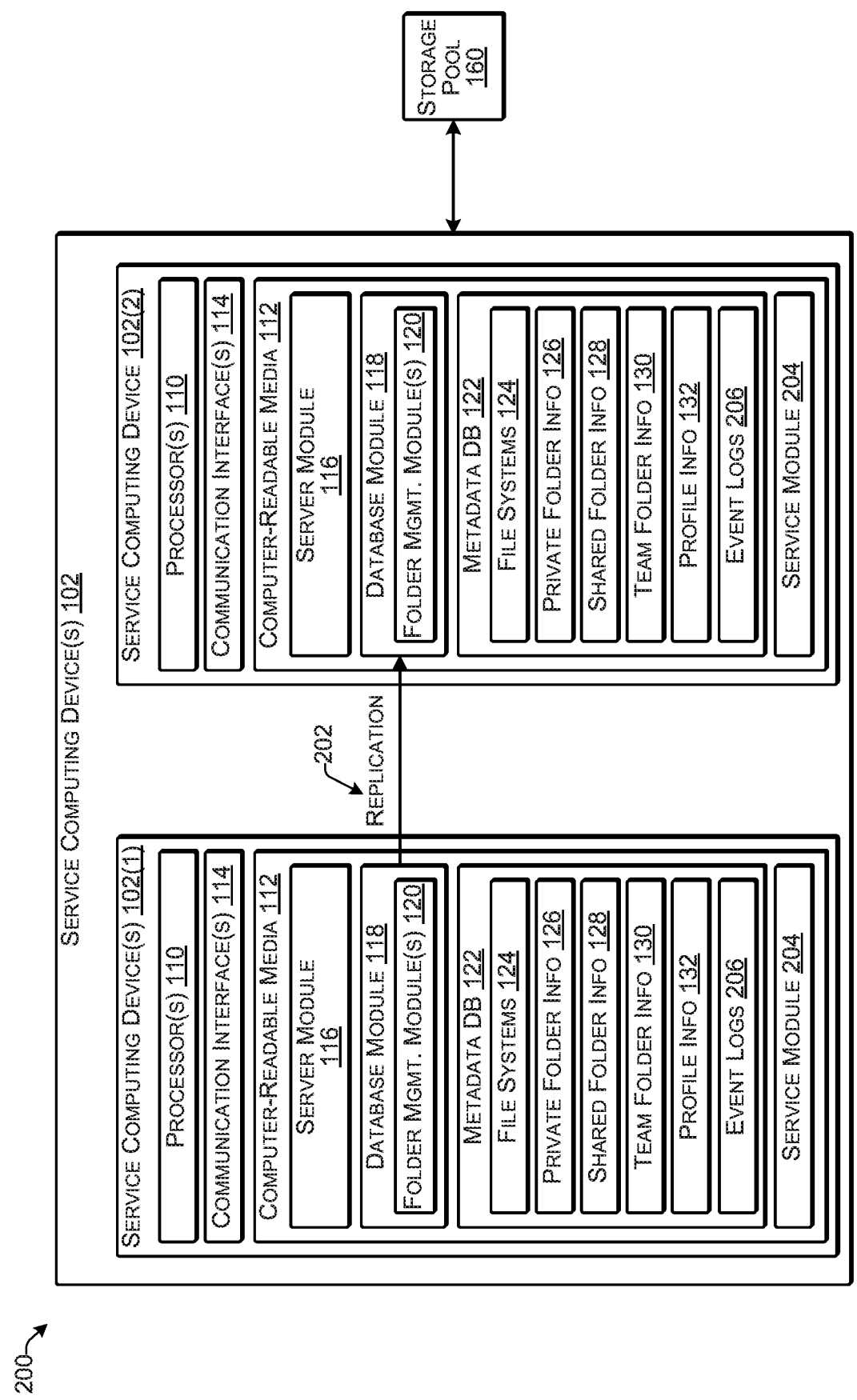
FIG. 2 illustrates an example configuration of the service computing devices according to some implementations.

FIG. 2 illustrates one possible example configuration 200 of the one or more service computing device(s) 102 according to some implementations. In the example configuration 200, a first service computing device 102(1) may be coupled to a second service computing device 102(2). For example, the first service computing device 102(1) and second service computing device 102(2) may together form a computing pod for providing storage and data management services to a plurality of the client computing devices 108 (not shown in FIG. 2). In some examples, the first service computing device 102(1) may act as a master or primary computing device, while the second service computing device 102(2) may act as a slave or secondary computing device, at least with respect to maintaining the metadata database 122. For instance, the database module 118 on the first service computing device 102(1) may update and maintain the metadata database 122 on the first service computing device 102(1). Furthermore, the folder management module(s) 120 on the first service computing device 120(1) may create team folders and may manage team folder information 130, shared folder information 128, and private folder information 126. As indicated at 202, the database module 118, or other module, on the first service computing device 102(1) may replicate the metadata database 122 to the second service computing device 102(2). Accordingly, the second service computing device 102(2) may maintain a replica of the metadata database 122, which may include a replica of the file systems 124, private folder information 126, shared folder information 128, team folder information 130, and profile information 132. Should the first service computing device 102(1) suffer a failure, the second service computing device 102(2) may assume the role of primary computing device while the first service computing device 102(1) is replaced with a different service computing device (not shown in FIG. 2) and/or repaired. During this time, the second service computing device 102(2) may maintain and update the metadata database 122.

In addition, the service computing devices 102 in this example include a service module 204. The service module 204 may perform various functions on the respective service computing device 102. As one example, the service module 204 may run periodically to determine any abandoned team folders and may send one or more instructions to cause permanent deletion of an abandoned team folder following the passage of a specified period of time. Alternatively, in other examples, the folder management module(s) 120 may perform this function.

In addition, the metadata database in this example may include one or more event logs 206. For example, received team folder requests may be logged automatically for auditing purposes on creation and resolution. The logging function herein may provide a full audit trail from the generation of a request to the final approval and creation of the team folder. Furthermore, the example of FIG. 2 is just one example of a possible configuration of the one or more service computing devices 102. Numerous other configurations may be apparent to those of skill in the art having the benefit of the disclosure herein.

Figure 3:
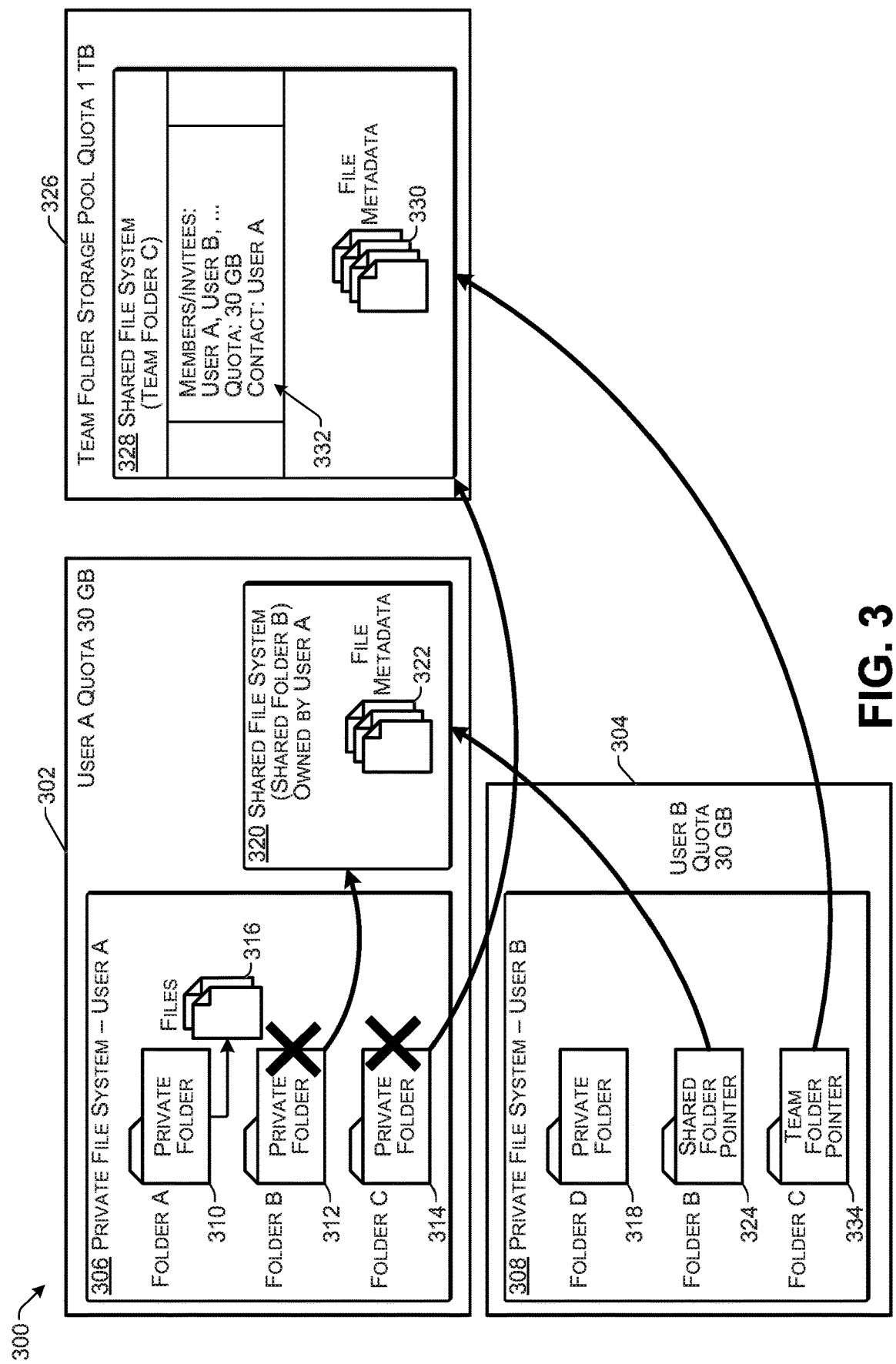
FIG. 3 is a block diagram illustrating an example relationship between private folders, shared folders, and team folders according to some implementations.

FIG. 3 is a block diagram 300 illustrating an example relationship between private folders, shared folders, and team folders according to some implementations. In this example, suppose that user A has a storage quota of 30 GB, as indicated at 302, and user B also has a storage quota of 30 GB, as indicated at 304. Furthermore, user A has a private file system for maintaining user A's private folders and files, and user B has a private file system 308 for maintaining user B's private folders and files. For example, suppose that user A initially has a private folder A 310, a private folder B 312, and a private folder C 314. For instance, some of user A's private files 316 may be stored in private folder A. Furthermore, suppose that user B initially has private folder D 318.

As mentioned above, a private folder may be a folder that is owned by and can solely be accessed by a particular user. For instance, objects, such as files 316, that are maintained in a private folder can only be accessed by the particular user that owns the private folder, and are therefore private to that user. The private folder may exist in the particular user's private file system. The storage consumed by the objects (e.g., files) stored in the storage system in association with the private folder count toward the user's storage quota.

In some cases, a user may desire to share a folder with one or more other users, and may therefore create a shared folder. In this example, suppose that user A would like to create a shared folder to be shared with user B. Accordingly, user A may convert folder B 312 to a shared folder. In this example, when the user converts folder B to a shared folder, the folder management module (not shown in FIG. 2) creates a new shared file system 320 to serve as the shared folder B. For example, the folder management module may create a new set of tables or other data structures in the metadata database that will serve as a shared file system 320, owned by user A, for use as the shared folder B. Furthermore, the folder management module may copy file metadata 322 for any files that were stored in the private folder B to the shared file system 320 for the shared folder B. The file metadata 322 corresponds to actual file content of files or other objects stored in the storage system and associated with the shared folder B. The private folder B 312 in the private file system 306 of user A is deleted and replaced with a shared folder pointer (not shown in FIG. 3) which may have the same name as private folder B, and which points to the shared file system 320 which serves as shared folder B.

The new shared file system 320 is owned by user A and therefore the files stored in association with folder B count against user A's storage quota of 30 GB. User A may invite user B to share the shared folder B, and upon accepting the invitation, the folder management module may create a pointer 324 in user B's private file system 308 for the shared folder B. Accordingly, a shared folder may be a folder that exists in its own file system and is owned by one user but is accessed by one or more users. For example, user B may access the files corresponding to the file metadata 322 in the shared folder B, and may store additional files to the storage associated with the shared folder B. However, the storage consumed by the objects (e.g., files) stored in the shared folder counts toward the owner's storage quota, i.e., user A's quota. Consequently, a particular user's storage quota may be quickly consumed by shared folders that are used for large projects or that are shared by a large number of users.

To address this issue, implementations herein provide team folders, which use storage allocated from a separate team folder storage pool 326. Thus, a team folder may be a folder that is not owned by any user but which may be accessed and managed by one or more users. The team folder may exist in its own file system. The storage capacity consumed by the objects stored in the team folder counts toward a storage quota defined for the team folder, rather than counting toward the storage capacity of any particular user.

In this example, suppose that user A desires to create a team folder and decides to convert private folder C 314 into a team folder. In other examples, as discussed below, the user may convert a shared folder into a team folder. Assuming the conversion request is approved, as discussed below, the folder management module may create a new shared file system 328 as the team folder C, which uses storage allocated from the team folder storage pool 326. Following copying of file metadata 330 from the private folder C 314 to the team folder C, the private folder C 314 in the private file system 306 of user A is deleted and replaced with a team folder pointer (not shown in FIG. 3) which may have the same name as private folder C, and which points to the shared file system 328 for the team folder C.

In this example, as indicated at 332, the members of the team folder C include user A and user B, the assigned storage quota is 30 GB, and the contact point for the team folder is user A. Furthermore, the metadata 330 may represent any files (or other objects) stored in the storage system for private folder C that are now stored in association with team folder C, and which now count against the storage quota of team folder C, rather than the storage quota of user A. In addition, the folder management module may send an invitation to user B to join the team folder C. In response to acceptance of the invitation by user B, the folder management module may place a pointer 334 in user B's private file system, such as a mount record, for enabling user B to access the team folder C, such as by selecting the pointer 334 in a user interface presented by the application on the client device associated with user B.

Figure 4:
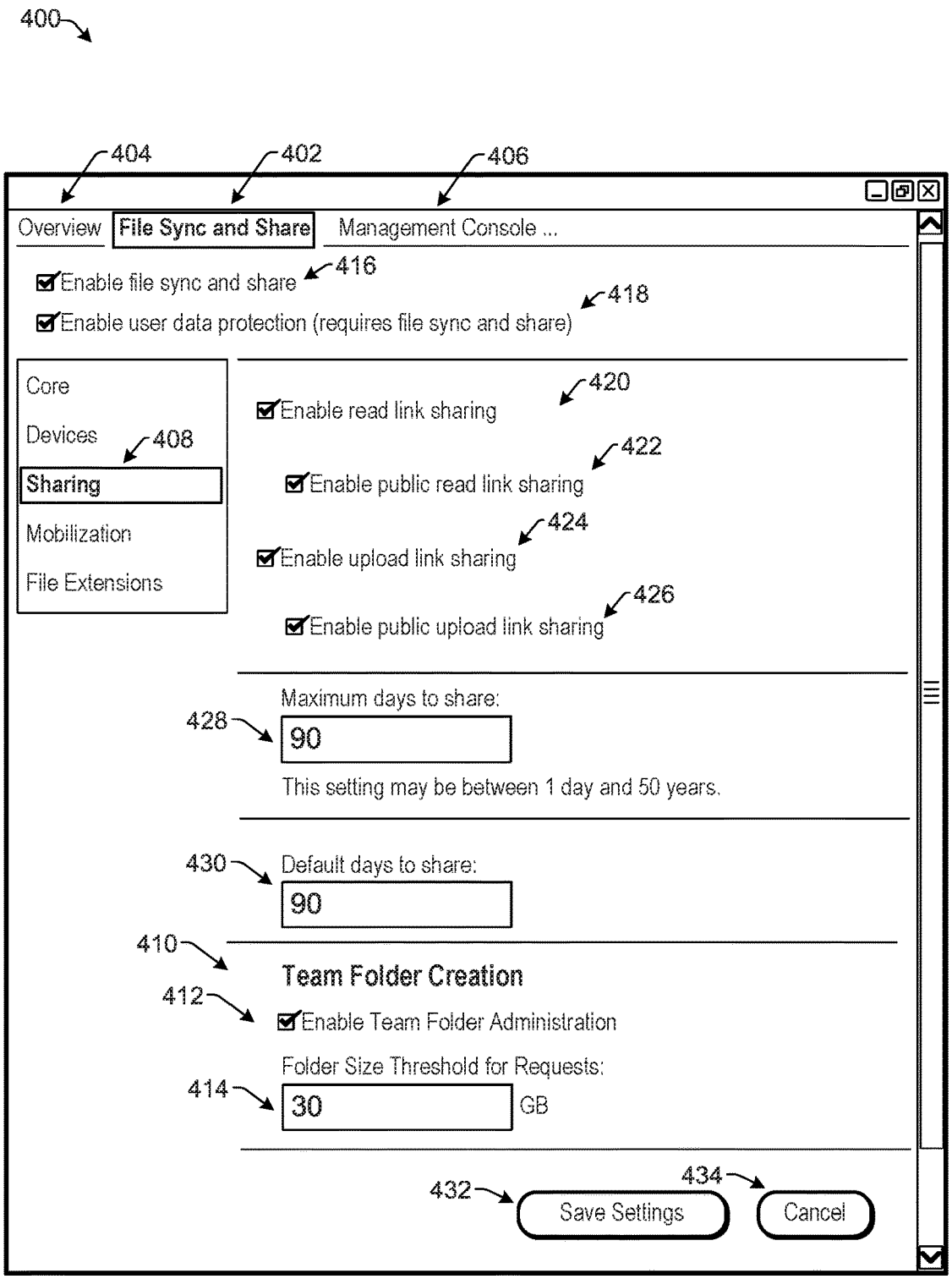
FIG. 4 illustrates an example user interface for managing team folder profile settings according to some implementations.

FIG. 4 illustrates an example user interface 400 able to be used for managing profile settings for team folders according to some implementations. For instance, the user interface 400 may be presented on a display of a device of an administrator or other user having sufficient permission status for setting team folder profile information. Options for the user interface 400 include a file sync and share window 402, an overview window 404, a management console window 406, and the like. In this example, to configure the team folder creation parameters, the user has selected the file sync and share window 402, and has selected "sharing" at 408 for controlling the configuration settings.

As mentioned above, a profile may be a mapping of functionality granted by the system to the individual users. In some examples, groups of users may have the same or similar profiles with the same or similar settings within the system. For example, the profiles herein may indicate whether particular users are able to create team folders, and if so, how large those team folders may be when created. Accordingly, users may be granted the ability to create team folders through their membership in a profile. The administrator creates a profile that contains, e.g., the user's active directory groups, security identity provider, or the like, and maps permissions to those users. The administrator may choose to allow the users that are included in the profile to administer their own team folders. If that permission is granted, the users who are members of the profile have the ability to create team folders.

As indicated at 410, the user interface 400 enables the user to set profile settings for team folders. As indicated at 412, the user may enable users other than administrators to have administrative privileges over their own team folders. For example, user having a manager role with respect to a particular team folder may have administrative rights for that team folder such as to enable deletion of the particular team folder, or changing a storage quota of the team folder. Furthermore, as indicated at 414, the user may set the maximum size for team folders for the profile. Thus, in this example, the maximum size for a team folder is set to be 30 GB. If a user with whom the profile is associated desires to create a team folder that is larger than 30 GB, the request must be approved by an administrator in advance before the team folder is created by the system. Furthermore, in some examples and additional user interface may be provided that enables the administrator to set the maximum size of the team folder storage pool and/or set different profile parameters for various different users for various different team folder settings.

In addition, the user interface 400 may include various other controls for various other settings, such as for enabling file sync and share, as indicated at 416, enable user data protection, as indicated at 418, enabling read link sharing, as indicated at 420, enabling public read link sharing, as indicated at 422, enabling upload link sharing, as indicated at 424, enabling public upload link sharing, as indicated at 426, selecting the maximum number of days to share, as indicated at 428, and selecting the default days to share, as indicated at 430. When the user has finished adjusting the settings in the user interface 400, the user may select a save settings button 432 to save the settings. Further, a cancel button 434 may be provided to be used if the user decides not to change any settings.

FIGS. 5, 7, 10, 12, and 13 are flow diagrams illustrating example processes according to some implementations. The processes are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation. Any number of the described blocks can be combined in any order and/or in parallel to implement the process, or alternative processes, and not all of the blocks need be executed. For discussion purposes, the processes are described with reference to the environments, frameworks and systems described in the examples herein, although the processes may be implemented in a wide variety of other environments, frameworks and systems.

Figure 5:
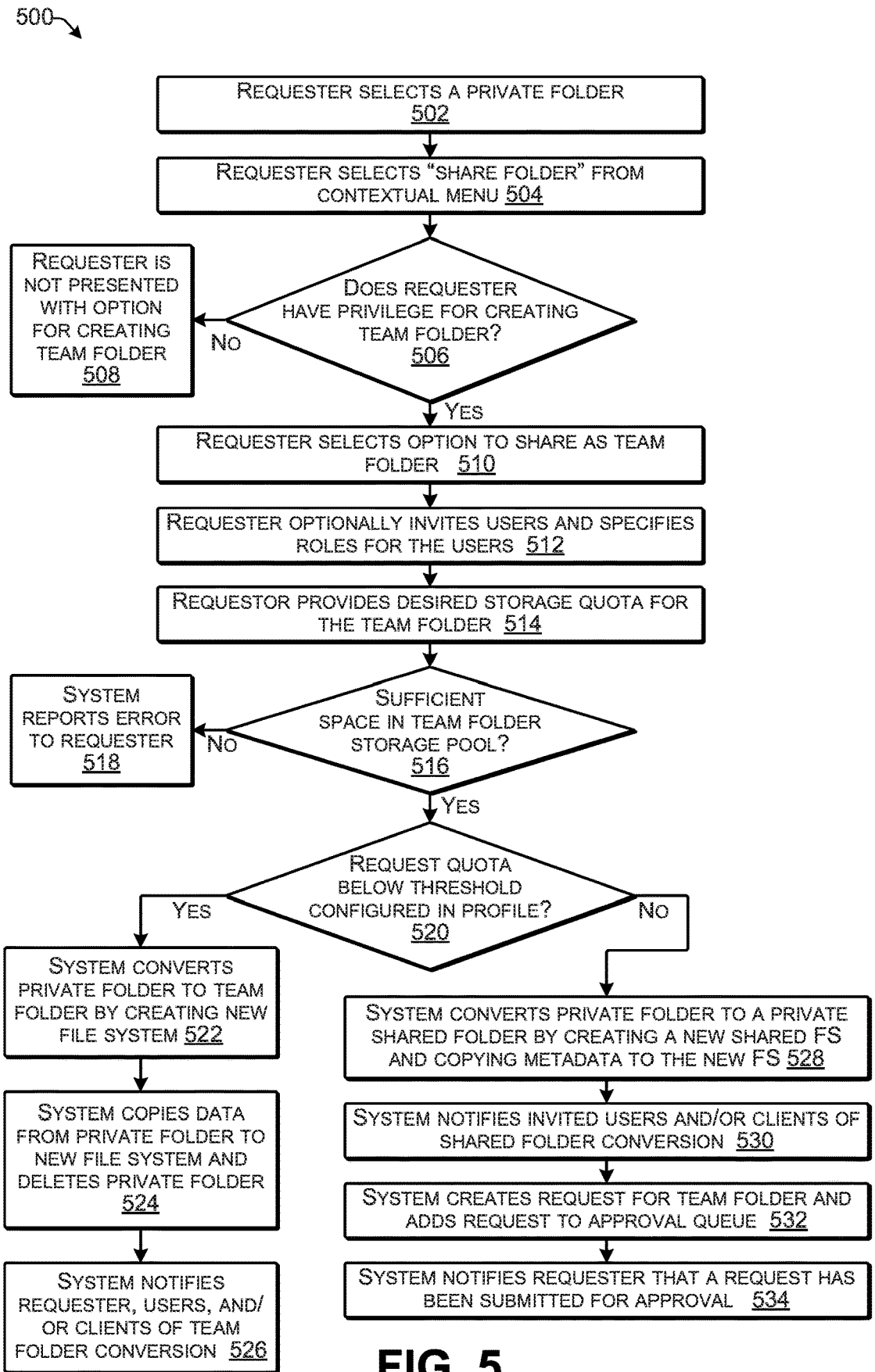
FIG. 5 is a flow diagram illustrating an example process for creating a team folder from a private folder according to some implementations.

FIG. 5 is a flow diagram illustrating an example process 500 for converting a private folder to a team folder according to some implementations. In some examples, the process 500 may be executed by the service computing device 102, or other suitable computing device, and may correspond to execution of the folder management module(s) discussed above.

At 502, suppose that a user desires to create a team folder from a private folder that exists in the user's private file system. For example, the requester (i.e., the requesting user) may be a particular user 134 using a client computing device 108 that is in communication with the service computing device 102, as described above with respect to FIG. 1. An application 136 on the client device may present the user with a user interface that includes a view of the private folders owned by the particular user. The user may select one of the private folders for conversion to a team folder. The client computing device may transmit this information to the service computing device.

At 504, the computing device may receive an indication from the requester's client device that the requester has selected a "share folder" option from a contextual menu presented the application on the requester device. For instance, not all users may be able to create team folders, but the users may have the option to share folders. Accordingly, initially the requester may select the share folder option.

At 506, the computing device may determine whether the requester has a privilege for creating a team folder. For instance, the computing device may access profile information associated with the user to determine whether the profile includes the privilege for creating team folders. As one example, when a user logs into the computer system, the system determines the profile membership of the user. If the user is a member of a profile containing the "team folder administration" permission, then the system is configured to present the user with additional workflows for administering team folders, including creation of team folders.

At 508, if the requester does not have a privilege for creating a team folder, the computing device may transmit information to the application on the client device to cause the application on the client device to not present the requester with an option for creating a team folder.

At 510, on the other hand, if the requester does have a privilege for creating a team folder, the computing device may transmit information to the application on the requester's client device to cause the application on the client device to present the requester with an option to share the selected private folder as a team folder rather than as a shared folder. For instance, as mentioned above with respect to FIG. 3, the private folder may be converted to a shared folder that remains owned by the user and which uses a portion of the user's allocated storage quota, or alternatively, the private folder may be converted to a team folder which is not owned by the user and which does not use a portion of the user's allocated storage quota. If the requester selects the option to share as a team folder, this information is received by the computing device.

At 512, the requester may also optionally invite one or more other users to have access to the team folder and further may specify roles for the invited users. For instance, the user may specify a role that each invited user may have with respect to the team folder, e.g., "viewer", "collaborator", or "manager". For example, a viewer may have read only privileges for the team folder; a collaborator may have read and write privileges for the team folder; a manager may have read/write privileges and administrator privileges for the team folder. In addition, by default, the system may set the requester as the contact point for the team folder. Subsequently, such as after the team folder has been created, the requester may choose to specify one of the invited users to be the contact point for the team folder. For example, if an administrator desires to contact a user about the particular team folder, the administrator can contact the contact point.

At 514, the requester may specify a desired storage quota for the team folder. The computing device receives this information from the client computing device along with the other selections of the requester associated with the team folder request.

At 516, the computing device determines whether there is sufficient storage space in the team folder storage pool to accommodate the requested storage quota for the requested team folder.

At 518, if there is not sufficient space in the team folder storage pool to accommodate the requested size of the team folder, the computing device reports an error to the requester indicating there is insufficient storage in the storage pool.

At 520, on the other hand, if there is sufficient storage capacity in the team folder storage pool, the computing device determines whether the requested storage quota for the team folder is below the threshold configured in the team folder profile associated with the requester. For instance, as discussed above with respect to FIG. 4, an administrator may specify a storage quota limit for team folders in a profile and may associate this profile with particular users or groups of users.

At 522, if the requested quota is below the threshold limit configured in the profile associated with the requester, the computing device converts the private folder to a team folder. For example, the system may create a new file system that is associated with the team folder storage pool and to which is allocated the requested storage quota from the team folder storage pool.

At 524, the computing device may copy data (e.g., file metadata) from the private folder to the new file system and subsequently delete the private folder. For example, the computing device may copy metadata for any objects stored in association with the private folder to the new file system for the team folder.

At 526, the computing device may notify the requester, any invited users, and/or other clients of the creation of the team folder. For example, the computing device may create a pointer to the team folder in the private file system of the requester. In addition, the computing device may send invitations to the users specified by the requester in the team folder creation request to invite those users to access the team folder. For example, users that accept the invitation may have a pointer to the team folder, such as a mount record, added to their private file systems. In addition, in some examples, the computing device may notify other clients of the existence of the team folder.

At 528, on the other hand, if the requested quota in the team folder creation request is greater than the permitted storage quota specified in the profile information created by the administrator, the computing device may convert the private folder to a private shared folder. As discussed above with respect to FIG. 3, this may entail creating a new shared file system and subsequently copying metadata from the private folder to the new shared file system. The private folder may then be deleted, and a pointer to the shared file system may be added to the requester's private file system. Accordingly, rather than creating the requested team folder, the computing device has at least temporarily created a shared folder that uses a portion of the requester's storage quota rather than the team folder storage quota. If an administrator subsequently approves the request to create the team folder, the private shared folder may then be converted to a team folder and may use storage allocated from the team folder storage pool rather than from the requester's own storage quota.

At 530, the computing device notifies invited users and or other clients of the shared folder conversion. For instance, invited users may be invited to access the shared folder created in response to the request. If the invited users accept the invitation, a pointer to the shared folder is created in the private file systems of the invited users. Thus, the invitees may begin collaboration using the shared folder until such time as the team folder is approved and the shared folder is converted to a team folder. Furthermore, in some examples, other clients may be notified of the creation of the shared folder.

At 532, the computing device creates a request for creation of a team folder and adds the request to a request queue provided to an administrator. For example, the computing device may indicate that the request for creation of the team folder exceeds the threshold storage quota associated with the profile of the requester. In some examples, the request queue or a communication related to the request queue may be sent to the administrator by email or through any other suitable electronic communication means.

At 534, the computing device may send to the requester an indication that a request has been submitted to an administrator for approval of the requested team folder. Subsequently, if the request is approved, the system may convert the shared folder to a team folder, as discussed additionally below, e.g., at blocks 716-720 of FIG. 7. Further, in some examples, an administrator may approve the request with an approved storage quota for the team folder that is smaller than that requested by the requester.

Figure 6:
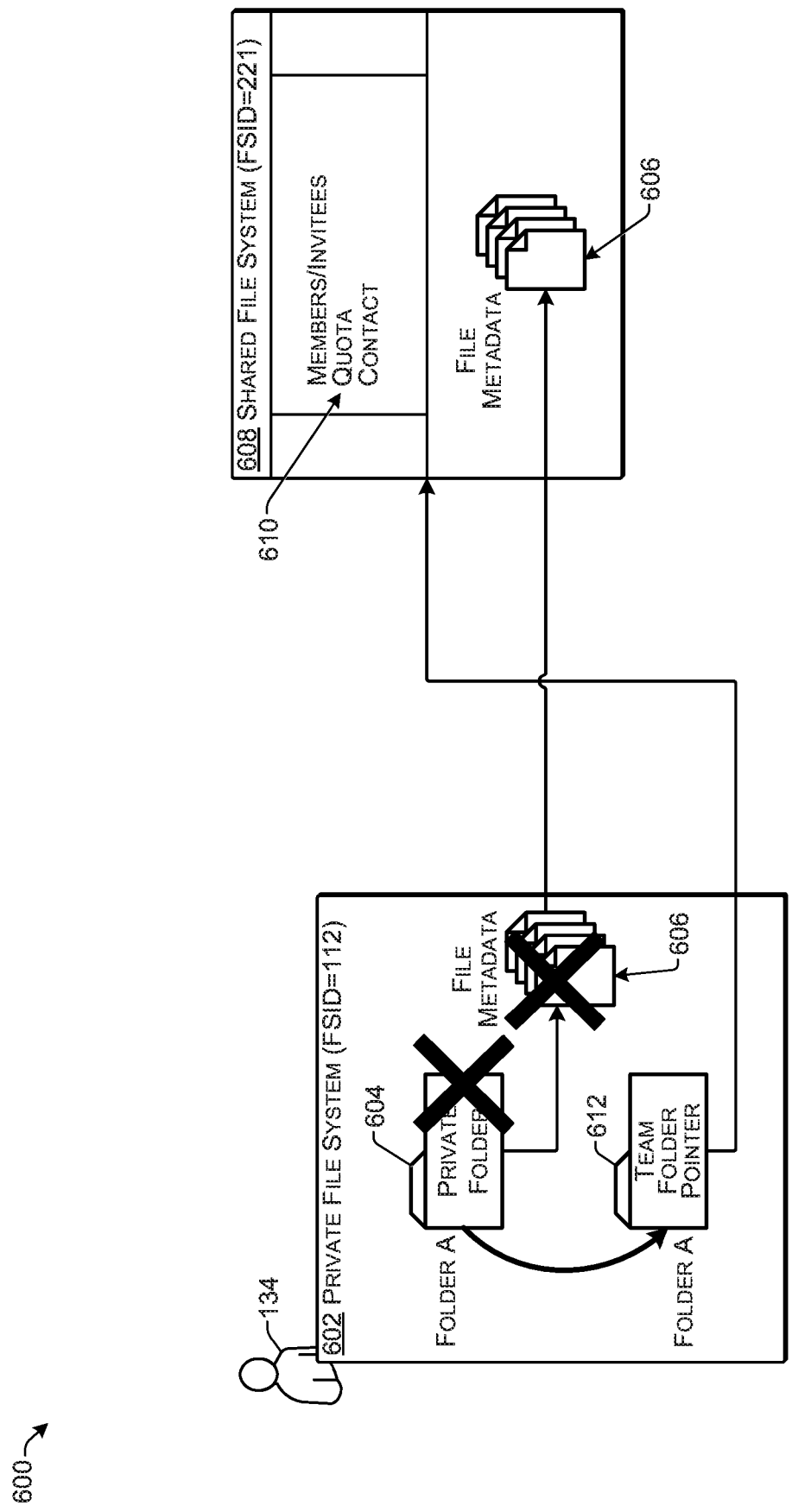
FIG. 6 is a block diagram illustrating creation of a team folder according to some implementations.

FIG. 6 is a block diagram 600 illustrating an example of converting a private folder to a team folder according to some implementations. In this example, suppose that a user 134 has a private file system 602 with a file system ID (FSID=112). Furthermore, suppose that in the private file system, the user 134 has a private folder 604, folder A, that contains file metadata for a plurality of files that are stored in the storage system 104 (not shown in FIG. 6). Accordingly, the private folder maintains file metadata 606 for the plurality of files stored in the storage system 104. In this example, the user desires to convert private folder A into a team folder. Accordingly, the user selects the folder A and submits a request to create a team folder as discussed above with respect to FIG. 5. For example, the user 134 may specify a desired storage quota for the team folder, may specify invitees to be invited to join the team folder, and may specify the respective roles of the invitees, as discussed above. Further, the system may set the requesting user 134 as the contact point for the team folder by default.

In response to receiving the request, if the request satisfies the requirements set forth above with respect to the process of FIG. 5, the system creates a shared file system 608 having a file system ID (FSID=221) different from that of the private file system 602. Furthermore as indicated at 610, the system may create the shared file system 608 with the requested storage quota, the system may invite the requested invitees, and the system may set the requesting user 134 as the contact point. In addition, the system may copy the current file information from the private folder to the team folder, which entails copying file metadata 606 from the private folder 604 to the shared file system 608. Accordingly, the files themselves remain on the storage system 104 and there is no need to copy the actual content of the files. In addition, the system deletes the private folder and creates a representation of team folder A 612, which is a pointer to the shared file system 608 in the private file systems 602 of the user, and which may have the same name as the now deleted private folder A.

Figure 7:
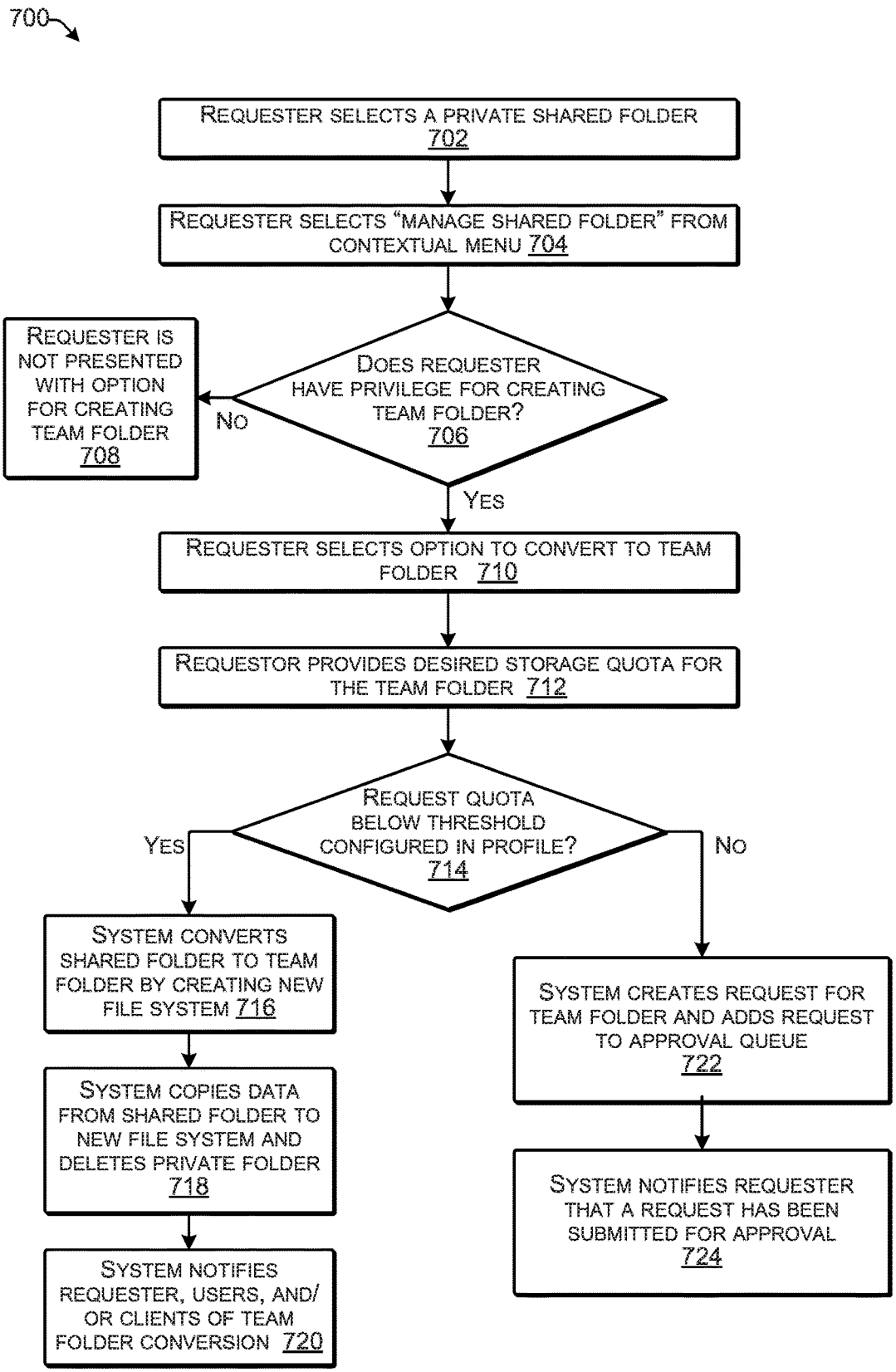
FIG. 7 is a flow diagram illustrating an example process for creating a team folder from a shared folder according to some implementations.

FIG. 7 is a flow diagram illustrating an example process 700 for converting a shared folder to a team folder according to some implementations. In some examples, the process 700 may be executed by the service computing device 102 or other suitable computing device, and may correspond to execution of the folder management module(s) discussed above.

At 702, suppose that a requester (requesting user) desires to create a team folder from a private shared folder that the requester owns, i.e., a shared folder that currently counts against the user's own storage quota. For example, similar to the process 500 discussed above with respect to FIG. 5, the requester may be a particular user 134 using a client computing device 108 that is in communication with the service computing device 102, as described above with respect to FIG. 1. An application 136 on the client device may present the user with a user interface that includes a view of the folders owned by the particular user. The user may select one of the shared folders owned by the user for conversion to a team folder. The client computing device may transmit this information to the service computing device.

At 704, the computing device may also receive an indication from the requester that the requester has selected a "manage shared folder" option from a contextual menu presented to the user by the application. For instance, not all users may be able to create team folders, but the users may have the option to manage their shared folders. Accordingly, initially the user may select the "manage shared folder" option.

At 706, the computing device may determine whether the requester has a privilege for creating a team folder. For example, the computing device may access profile information associated with the user to determine whether the profile includes the privilege for creating team folders.

At 708, if the requester does not have a privilege for creating a team folder, the computing device may transmit information to the application on the client device to prevent the application on the client device from presenting the requester with an option for creating a team folder.

At 710, on the other hand, if the requester does have a privilege for creating a team folder, the computing device may transmit information to the application on the client device to cause the application on the client device to present the requester with an option to convert the selected shared folder to a team folder. If the requester selects the option to convert to a team folder, this information is received by the computing device. Furthermore, in some examples, the requester may also optionally invite one or more new users to have access to the team folder, and further may specify roles for any existing members of the shared folder or new invitees. For instance, these actions may be performed by the requester as a separate operation performed outside of the conversion workflow described in FIG. 7, or alternatively, may be performed as part of the conversion workflow. For instance, the user may specify a role that each invited user or existing member may have with respect to the team folder, e.g., "viewer", "collaborator", or "manager". In addition, the system may assign, by default, the requester to be the contact point for the team folder.

At 712, the requester may specify a desired storage quota for the team folder. The computing device receives this information from the client computing device along with the other selections of the requester associated with the team folder request.

At 714, the computing device determines whether the requested storage quota for the team folder is below the threshold configured in the team folder profile associated with the requester. For instance, as discussed above with respect to FIG. 4, an administrator may specify a storage quota limit for team folders in a profile and may associate this profile with particular users. At this point, the computing device may also perform block 516 discussed above with respect FIG. 5, i.e., to determine whether there is sufficient storage space in the team folder storage pool to accommodate the requested storage quota for the requested team folder.

At 716, if the requested quota is below the threshold limit configured in the profile associate with the requester, the computing device converts the shared folder to a team folder. For example, the system may create a new file system that is associated with the team folder storage pool and to which is allocated the requested storage quota from the team storage pool.

At 718, the computing device may copy data (e.g., file metadata) from the shared folder file system to the new file system and subsequently delete the shared folder file system. For example, the computing device may copy metadata for any objects stored in the shared folder to the new file system for the team folder.

At 720, the computing device may notify the requester, any members of the shared folder, any invited users, and/or other clients of the creation of the team folder. For example, the computing device may create a pointer to the team folder in the private file system of the requester and any existing members. Accordingly, the system may automatically associate, with the team folder, membership information from the shared folder to provide members of the shared folder access the team folder. In addition, the computing device may send invitations to any additional users specified by the requester to invite those users to access the team folder. In some examples, the users to invite may be specified by the requester as a separate operation, and the invitations may be sent as part of a separate workflow outside of the conversion request workflow. In other examples, the users may be invited, and the invitations may be sent, in association with the workflow for creation of the team folder. For example, users that accept the invitation may have a pointer to the team folder added to their respective private file systems. In addition, in some examples, the computing device may notify other clients of the existence of the team folder. In addition, any existing members of the shared folder may be associated with roles specified for them for the team folder. Similarly, any users that accept an invitation to join the team folder may have a role associated with them when the system provides these users with access to the team folder.

At 722, on the other hand, if the requested quota in the team folder creation request is greater than the permitted storage quota specified in the profile information created by the administrator, the computing device may create a request for creation of a team folder and add the request to a request queue submitted to an administrator. For example, the computing device may indicate that the request for creation of the team folder exceeds the threshold storage quota associated with the profile of the requester. In some examples, the request queue may be sent to the administrator by email or through any other suitable electronic communication means.

At 724, the computing device may send to the requester an indication that a request has been submitted to an administrator for approval of the requested team folder. While the request is being processed and waiting for administrator approval, the user and other members may continue to use the shared folder. Subsequently, if the request is approved, the system may perform blocks 716-720, as discussed above. Further, in some examples, an administrator may approve the request with an approved storage quota for the team folder that is smaller than that requested by the requester.

Figure 8:
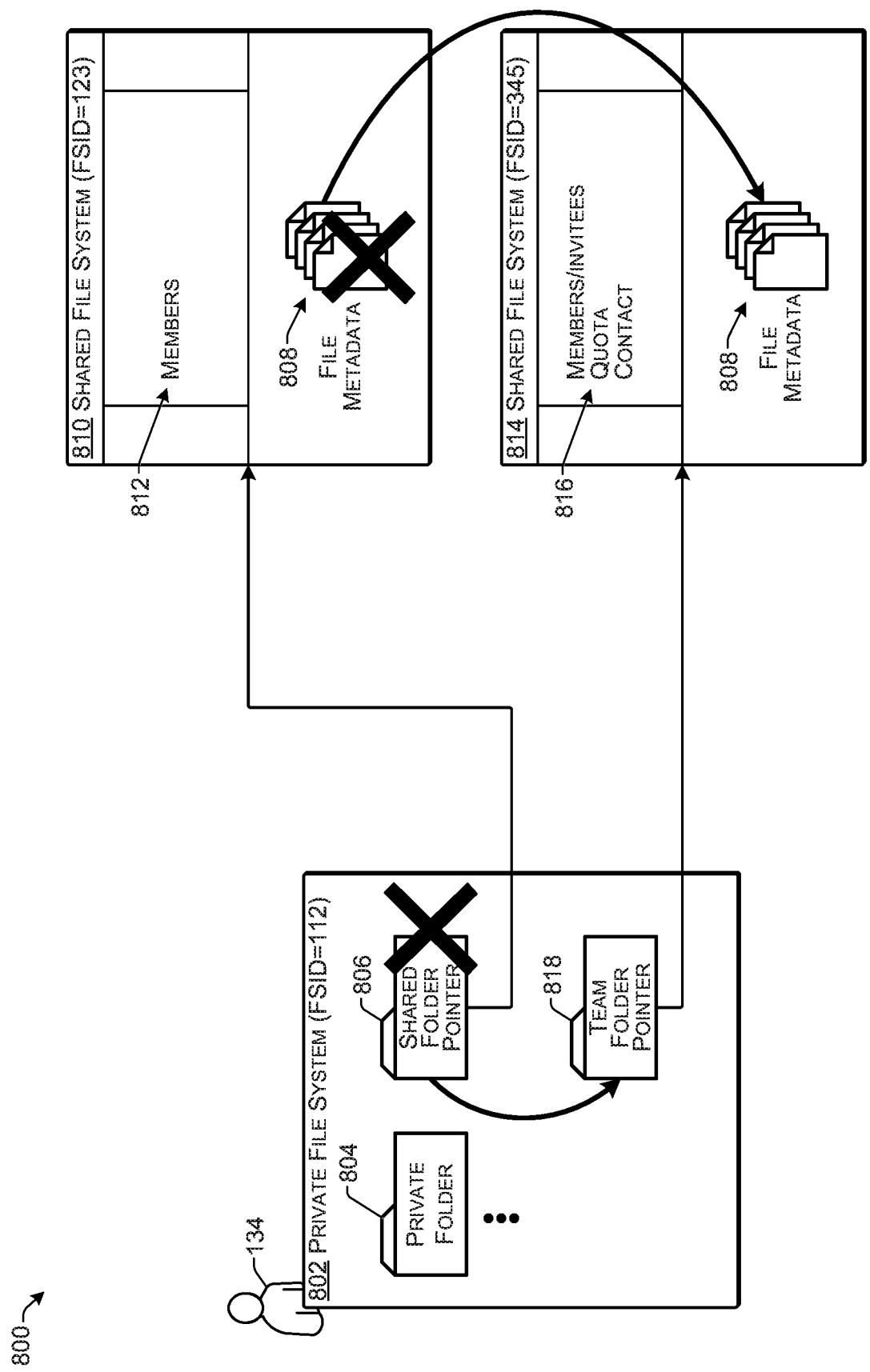
FIG. 8 is a block diagram illustrating creation of a team folder according to some implementations.

FIG. 8 is a block diagram 800 illustrating an example of converting a shared folder to a team folder according to some implementations. In this example, suppose that a user 134 has a private file system 802 with a file system ID (FSID=112). Furthermore, suppose that in the private file system 802, the user has one or more private folders 804 and a pointer 806 for a shared folder that contains metadata 808 for a plurality of files that are stored in the storage system 104 (not shown in FIG. 8). For instance, the pointer 806 may be a mount record, or the like, that points to a shared file system 810, owned by the user 134, and having a file system ID (FSID=123). Further, the shared file system 810 may have one or more existing members as indicated at 812. In this example, suppose that the user wants to convert the shared folder 806 to a team folder. Accordingly, the user selects the shared folder 806 and submits a request to create a team folder as discussed above with respect to FIG. 7. For example, the user 134 may specify a desired storage quota for the team folder, may specify invitees to be invited to join the team folder and/or may specify the respective roles of the current members and any new invitees, as discussed above. In some examples, the specifying of invitees and/or roles for the invitees may be performed as an operation that is separate from submitting the request for converting the shared folder to the team folder, such as before or after submitting the request.

In response to receiving the request, if the request satisfies the requirements set forth above with respect to the process of FIG. 7, the system creates a new shared file system 814 having a file system ID (FSID=345) different from that of the private file system 802. Furthermore, as indicated at 816, the system may create the shared file system 814 to serve as the team folder with the requested storage quota allotted from the team folder storage pool. In addition, the system may copy the current file information from the shared folder file system 810 to the team folder, which may entail copying file metadata 808 from the shared filed system 810 to the new shared file system 814. Accordingly, the files themselves remain unchanged on the storage system 104 (not shown in FIG. 8) and there is no need to copy the actual content of the files.

In addition, the system deletes the pointer 806 to the shared folder and creates a pointer 818 for the team folder, such as a mount record, which is a pointer to the shared file system 814 that is placed in the private file system 802 of the user, and which may have the same name as the deleted pointer 806. The system may similarly delete the old pointer and create a new pointer in the private file systems of any existing members of the shared folder 806. In addition, the system may invite any newly requested invitees, and may add the pointer 818 to the private file systems of any new invitees who have accepted the invitation to join the team folder. For example, there may be users who were invited to join the shared folder, but who did not accept until after the shared folder was converted to the team folder.

Figure 9:
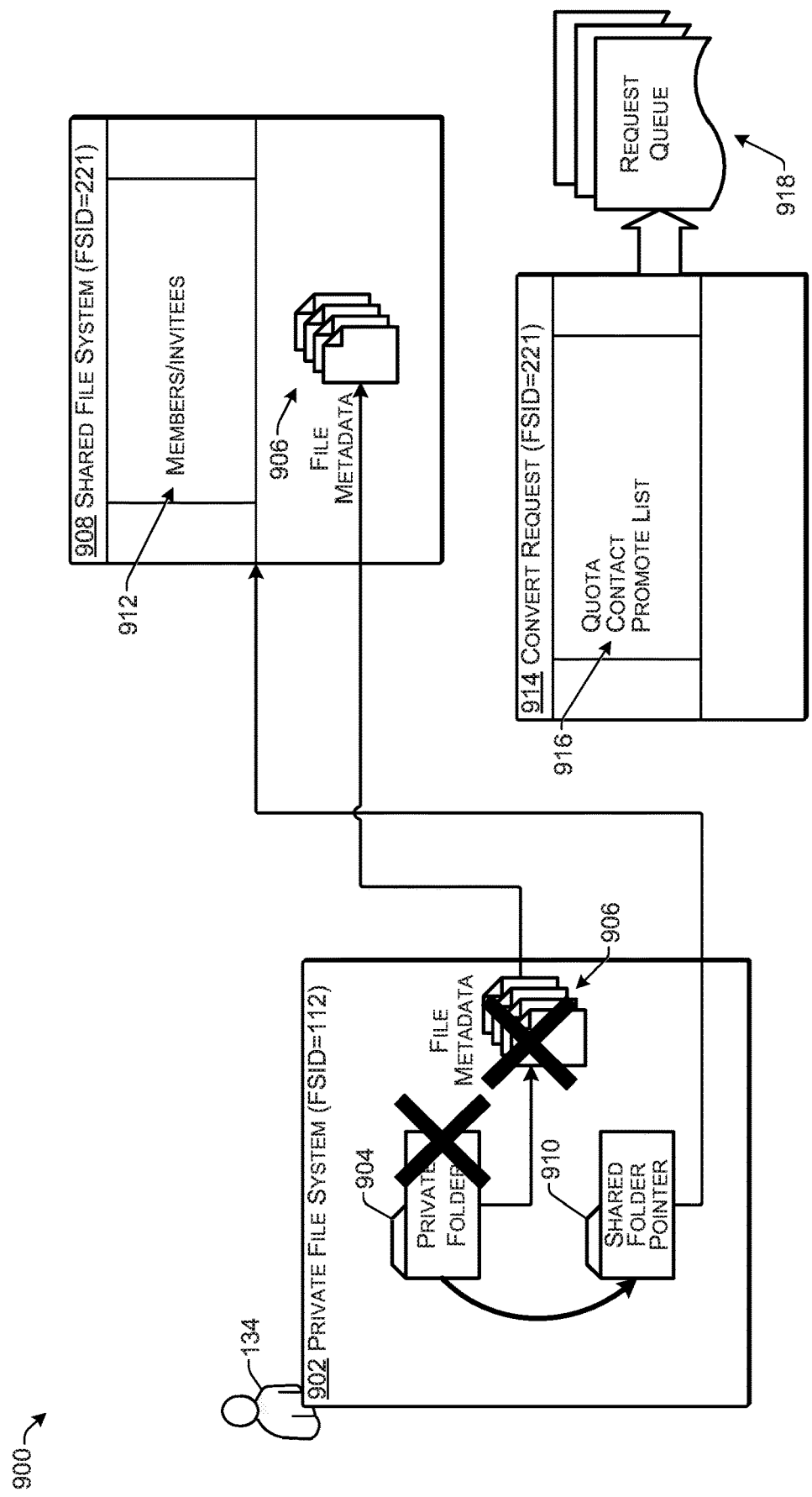
FIG. 9 is a block diagram illustrating creation of a shared folder according to some implementations.

FIG. 9 is a block diagram 900 illustrating an example of converting a private folder to a team folder according to some implementations. In this example, similar to the example of FIG. 6 discussed above, suppose that a user 134 has a private file system 902 with a file system ID (FSID=112). Furthermore, suppose that in the private file system, the user 134 has a private folder 904 that contains metadata 906 for a plurality of files that are stored in the storage system 104 (not shown in FIG. 9). In this example, the user 134 desires to convert the private folder 904 into a team folder. Accordingly, the user selects the private folder 904 and submits a request to create a team folder as discussed above with respect to FIG. 5. For example, the user 134 may specify a requested storage quota for the team folder, as discussed above. However, in this example, suppose that the requested storage quota is greater than the storage quota permitted by the profile associated with the user for team folders.

In response to receiving the request from the user 134, the system determines that the requested storage quota is larger than the storage quota threshold permitted for team folders for this user. Accordingly, rather than creating a shared file system from the team folder storage pool, the system creates a shared file system 908 having a file system ID (FSID=221) that is owned by the user 134 and that uses a portion of the user's own storage quota. In addition, the system may copy the current file information from the private folder to the team folder, which may include copying file metadata 906 from the private folder 904 to the shared file system 908. Accordingly, the files themselves remain on the storage system 104 and there is no need to copy the actual content of the files. In addition, the system deletes the private folder 904 and creates a shared folder pointer 910 that points to the shared file system 908 and that is placed in the private file system 902 of the user. Furthermore, as indicated at 910, the system may invite the requested invitees and may set pointers to the shared file system 908 in the private file systems of users who accept the invitation.

In addition, the system creates a convert request 914 for the shared file system 908. For example, the convert request may refer to the file system ID (FSID=221) of the shared file system 908. Further, the convert request may include various information for the requested team folder, as indicated at 916, such as the requested quota amount for the requested team folder, the contact point for the requested team folder, and a list of users to promote for the requested team folder. The system adds the convert request to the request queue 918 to request administrator approval of the requested quota for the request team folder. Further, the team folder request may be logged automatically for auditing purposes on creation and resolution. In some cases, administrators may delegate request approval to non-administrative users, who may act as administrators for purposes of approving, changing, or denying team folder creation requests. The system may further provide an administrator user interface, as discussed above, to enable an administrator to review requests, set profile settings for team folders, and also set other parameters for team folders.

The shared folder i.e., the shared file system 908 may serve temporarily as a team folder until the requested team folder is approved by an administrator such as using a manual override of the storage quota threshold or by reducing the size of the storage quota for the team folder to a size that is below the storage quota threshold for the associated profile. It is also possible for the administrator to increase the size of the storage quota for the team folder to be larger than that requested, such as in a situation in which the administrator decides that the team folder will need more than the requested storage quota. However, during the time until the requested team folder is approved, the shared file system 908 may count against the storage quota of the user that is the owner of the shared file system, i.e., the requester of the team folder. Subsequently, following approval of the team folder request, the shared file system 908 may be converted to a team folder shared file system that allocates storage from the team folder storage pool.

Figure 10:
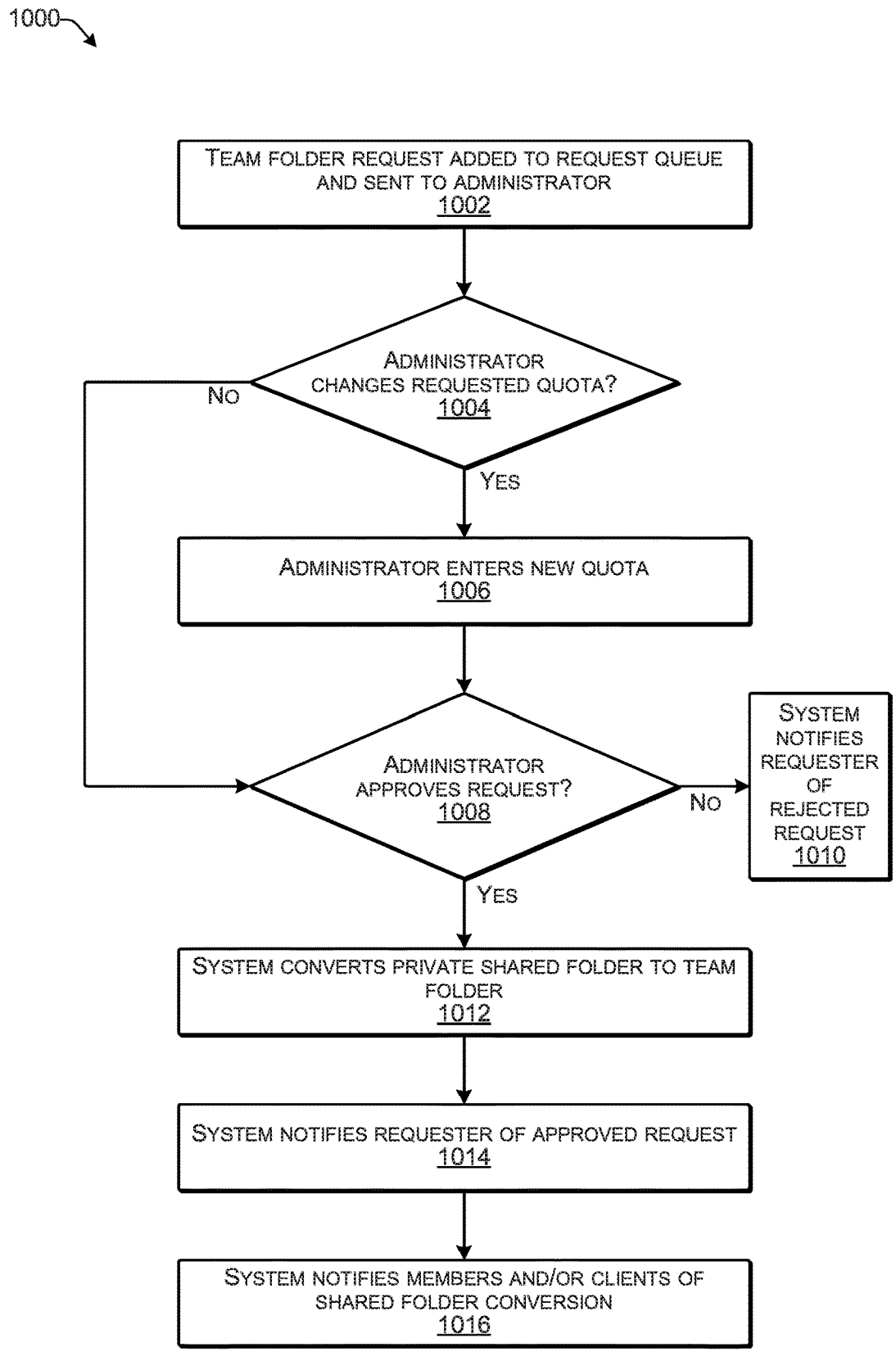
FIG. 10 is a flow diagram illustrating an example process for administrator review of a team folder request according to some implementations.

FIG. 10 is a flow diagram illustrating an example process 1000 for administrator review of a team folder request according to some implementations. In some cases, the process 1000 may be executed, at least in part, by the service computing device 102 or other suitable computing device, and may correspond to execution of the folder management module(s) discussed above.

At 1002, the computing device may add a rejected team folder request to the request queue and send the request queue and/or a communication related to the request queue to an administrator. For example, if the team folder request received from a requester asks for a storage quota that exceeds the permissible threshold, the computing device may reject the team folder creation request, as discussed above with respect to FIG. 9, and may send a communication to the administrator to seek administrator approval of the request.

At 1004, based on a response received from the administrator, the computing device may determine whether or not the administrator has changed the requested storage quota for the team folder.

At 1006, if the administrator changes the requested storage quota amount, the computing device may determine the new quota amount entered by the administrator.

At 1008, the computing device may determine whether the administrator has approved the team folder request. As one example, the administrator may have overridden the quota limitation for team folders and made an exception to allow this team folder to be created with a storage quota larger than the threshold set for the profile. As another example, the administrator may have changed the requested quota to a smaller, allowable amount. As still another example, the administrator may have rejected the team folder request altogether.

At 1010, if the administrator rejected the team folder request altogether, the computing device may notify the requester of the rejected request, such as through an in application communication to the application executing on the requester's client computing device.

At 1012, on the other hand, if the administrator approved the team folder creation request, either with the originally requested quota or with a smaller quota entered by the administrator, the computing device converts the shared folder owned by the requester to a team folder. For example, the conversion from the shared folder to the team folder may be performed in a manner similar to that discussed above with respect to FIGS. 7 and 8.

At 1014, the computing device may notify the requester of the approval of the team folder creation request.

At 1016, the computing device may notify members of the shared folder and/or other clients of the shared folder conversion to a team folder.

Figure 11:
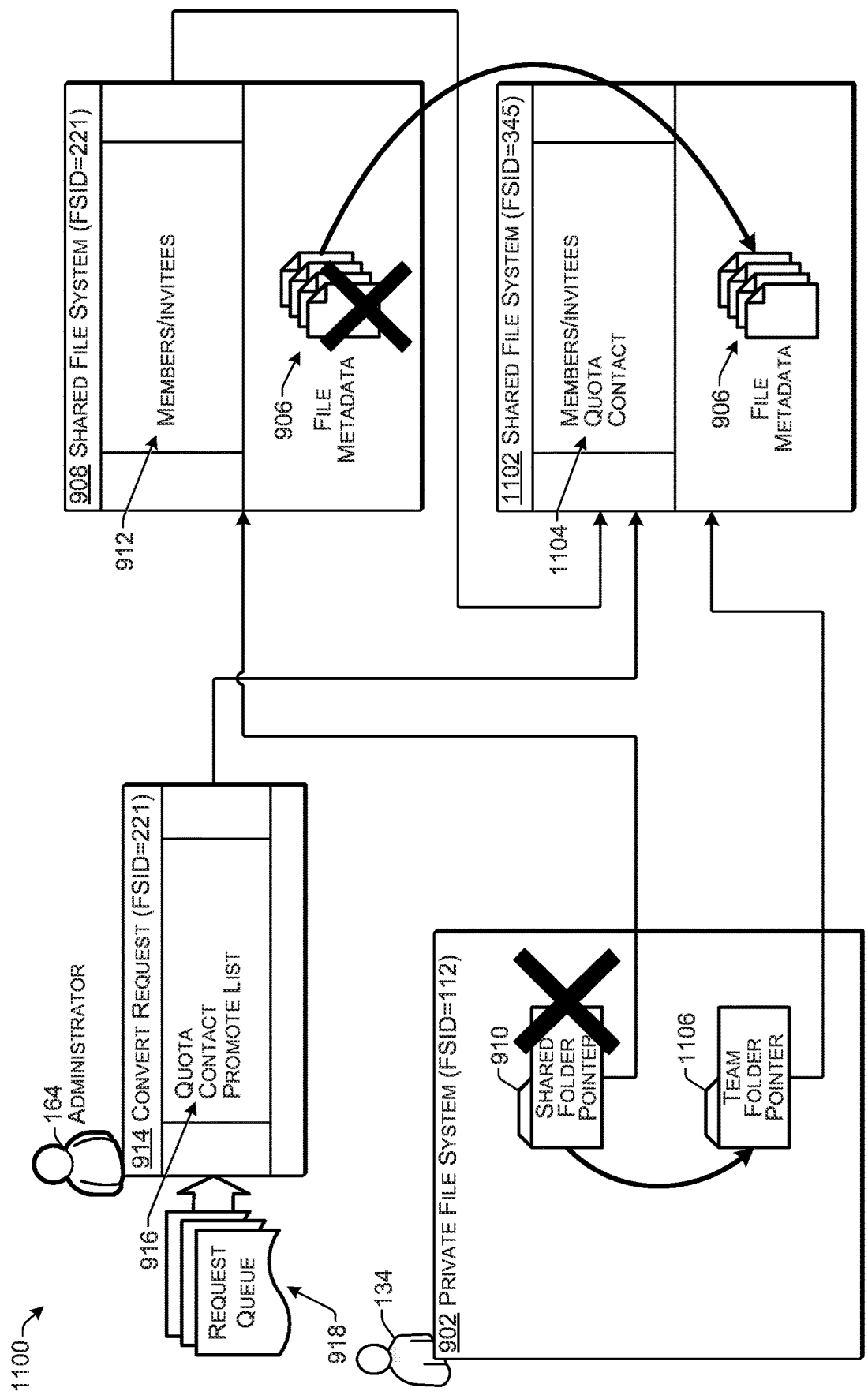
FIG. 11 is a block diagram illustrating creation of a team folder following approval of the team folder approval request in FIG. 9 according to some implementations.

FIG. 11 is a block diagram 1100 of an example of converting the shared file system of FIG. 9 to a team folder following approval by an administrator of the team folder request according to some implementations. Following the example 900 discussed above with respect to FIG. 9, suppose that an administrator 164 reviews the convert request 914 in the request queue 918 and either approves the requested quota, such as by overriding the threshold quota limitation, or by approving the convert request 916 with a reduced storage quota amount. In response, the system creates a new shared file system 1102 having a file system ID (FSID=345) different from that of the shared file system 908. Furthermore, as indicated at 1104, the system may create the shared file system 1102 with the storage quota specified by the administrator 164, the members/invitees previously specified, and the requesting user 134 as the contact point. In addition, the system may copy the file metadata 906 from the shared filed system 908 to the new shared file system 1102. In addition, the system associates membership information with the team folder indicating members of the shared folder that are able to access the team folder, and/or associates invitee information indicating users to invite to access the team folder. Accordingly, the system deletes the pointer 910 to the shared folder and creates a pointer 1106 for the team folder, such as a mount record, in the private file system 902 of the user 134. For example, the pointer 1106 to the team folder may have the same name in the file system 902 as the deleted pointer 910 to the shared folder. The system may similarly delete the old pointer and create a new pointer in the private file systems of any existing members of the shared folder 908. In addition, the system may create a pointer to the team folder in the private file systems of any new invitees who have accepted the invitation to join the team folder. Furthermore, members of the shared folder who have been assigned specific roles for the team folder may be promoted to those roles following creation of the team folder. For example, members who have been granted a manager role may be promoted to having administrative privileges with respect to the team folder.

In addition, following creation of a team folder, any user having team folder administration enabled in their profile and having a specified role of manager of the particular team folder may request that the storage quota of the team folder be changed. The process for changing a storage quota for a team folder has a workflow similar to the creation/conversion requests discussed above, e.g., with respect to FIGS. 5-11. For example, if a requested change to the storage quota for a team folder asks for an amount of storage quota that is less than the configured threshold, the system may automatically approve the request. Thus, a manager updating a team folder can increase the storage quota of a team folder automatically if: (1) there is available space in the team folder storage pool; (2) the user submitting the request is a manger of the team folder and the user is a member of a profile that has a privilege to administer team folders; and (3) the requested size of the new storage quota will not increase the storage quota of the team folder above the threshold limit set in the respective profile associated with the user/team folder. Accordingly, if the above criteria is met, the increase (or decrease) in the storage quota may be performed automatically without interaction with the system administrator.

On the other hand, if the user asks for an increase in the storage quota for the team folder to a size that is larger than the configured threshold size limit set in the associated profile, a request for approval is created, similar to the examples of discussed above. The system may place the request into the request queue and a communication may be sent to the system administrator to ask for approval of the request for a storage quota greater than the threshold setting. The communication to the administrator and the request approval queue may be managed as described above, e.g., with respect to FIGS. 9-11.

Figure 12:
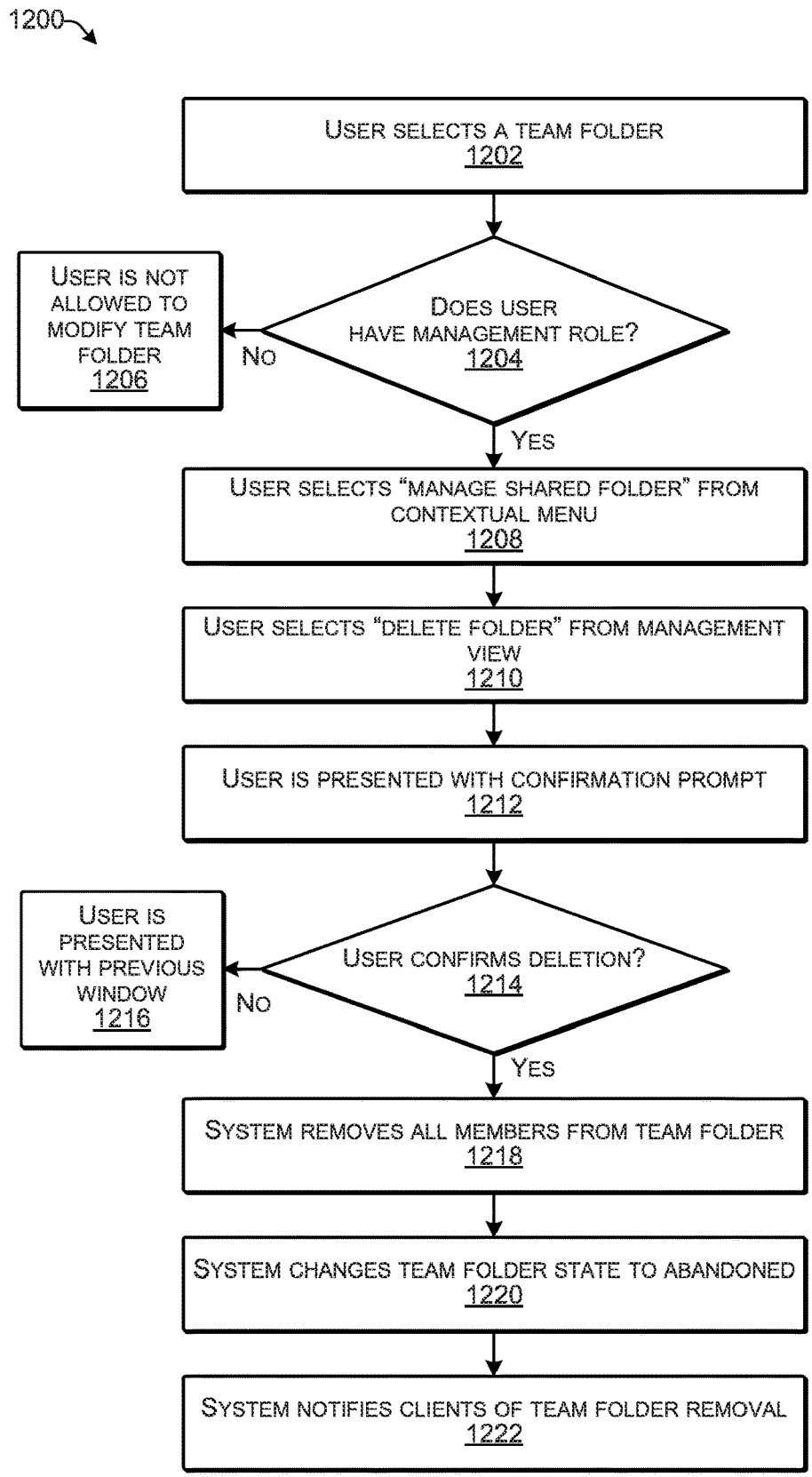
FIG. 12 is a flow diagram illustrating an example process for deleting a team folder according to some implementations.

FIG. 12 is a flow diagram illustrating an example process 1200 for deletion of a team folder according to some implementations. In some cases, the process 1200 may be executed by the service computing device 102 or other suitable computing device, and may correspond to execution of the folder management module(s) discussed above.

At 1202, the computing device may receive a user selection of a team folder. For example, as discussed above, a user may interact with the user interface presented on the client device to select a team folder, such as by selecting a team folder pointer present in the private file system of the user.

At 1204, the computing device may determine whether the user has a management role with respect to the selected team folder.

At 1206, if the user does not have a management role, the computing device may determine that the user is not allowed to modify or delete the team folder.

At 1208, on the other hand, if the user does have a management role with respect to the team folder, the computing device may receive an indication that the user has selected "manage shared folder" from a contextual menu in the user interface on the client device.

At 1210, the computing device may receive an indication that the user has selected "delete folder" from the management view presented to the user in the user interface on the client device.

At 1212, the computing device may determine the user has been presented with a confirmation prompt to confirm that the user intends to delete the selected team folder.

At 1214, the computing device may determine whether the user confirms deletion of the selected team folder.

At 1216, if the user does not confirm deletion of the selected team folder, the user may be presented with a previous window.

At 1218, on the other hand, if the user does confirm deletion of the selected team folder, the computing device may remove all members from the selected team folder. This disassociates all members from the team folder.

At 1220, the computing device may change the state of the team folder to "abandoned". For example, the metadata database may maintain a state of each file system created in the metadata database, and the state for the particular shared file system may be changed from active to abandoned. The computing device may record a time at which the team folder status was changed to abandoned.

At 1222, the system may notify client devices of the team folder deletion/removal. This may include removing the pointer to the team folder from the private file system of each of the members of the team folder.

Figure 13:
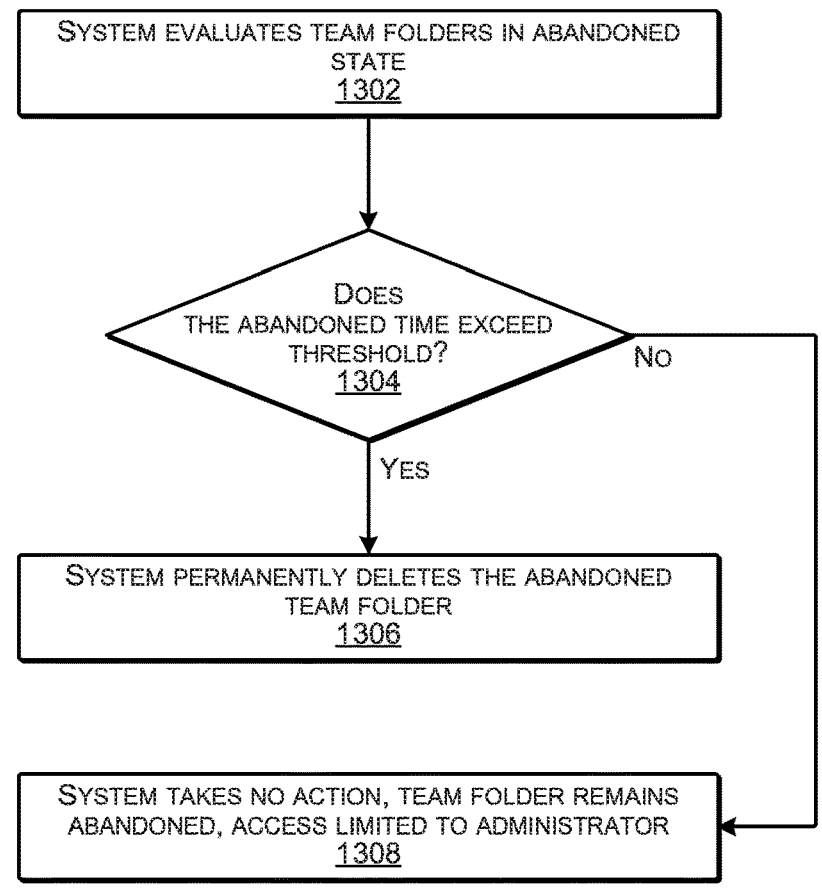
FIG. 13 is a flow diagram illustrating an example process for examination of abandoned team folders according to some implementations.

FIG. 13 is a flow diagram illustrating an example process 1300 for identifying team folders in an abandoned state according to some implementations. In some examples, the process 1300 may be executed by the service computing device 102 or other suitable computing device, and may correspond to execution of the folder management module(s) and/or the service module discussed above.

At 1302, the computing device may evaluate team folders in an abandoned state. For example, the computing device may determine any shared file systems associated with the team folder storage pool that are in an abandoned state and may further determine the time at which the respective team folders were abandoned.

At 1304, the computing device determines whether the abandoned time exceeds a threshold time limit. For example, the threshold time may be based on an abandoned folder retention policy, and may be configurable and set by an administrator for a specified period of time, such as one week, one month, six weeks, or the like. As one example, after the threshold time has expired, the folder and associated data and objects may be permanently deleted.

At 1306, if the computing device determines that the abandoned time exceeds the threshold time limit, the computing device may permanently delete the abandoned team folder. The permanent deletion of the abandoned team folder may include determining whether the files associated with the team folder are associated with any other folders in the metadata database. For those files that are not associated with any other folders in the metadata database, the computing device may send an indication to the storage system to delete permanently those files. In addition, the computing device may remove all metadata related to the team folder from the metadata database.

At 1308, on the other hand, if the computing device determines that the abandoned time does not exceed the threshold time limit, the computing device may take no action with respect to the team folder and the team folder remains abandoned for the time being. During this time, access to the abandoned team folder is limited to access by an administrator. For example, if a user determines that the team folder was deleted by accident or deleted maliciously, an administrator may reinstate the team folder to full functionality anytime up until the team folders permanently deleted as discussed above with respect to block 1306. As one example, the administrator may restore a team folder by adding at least one member with a manager role.

Figure 14:
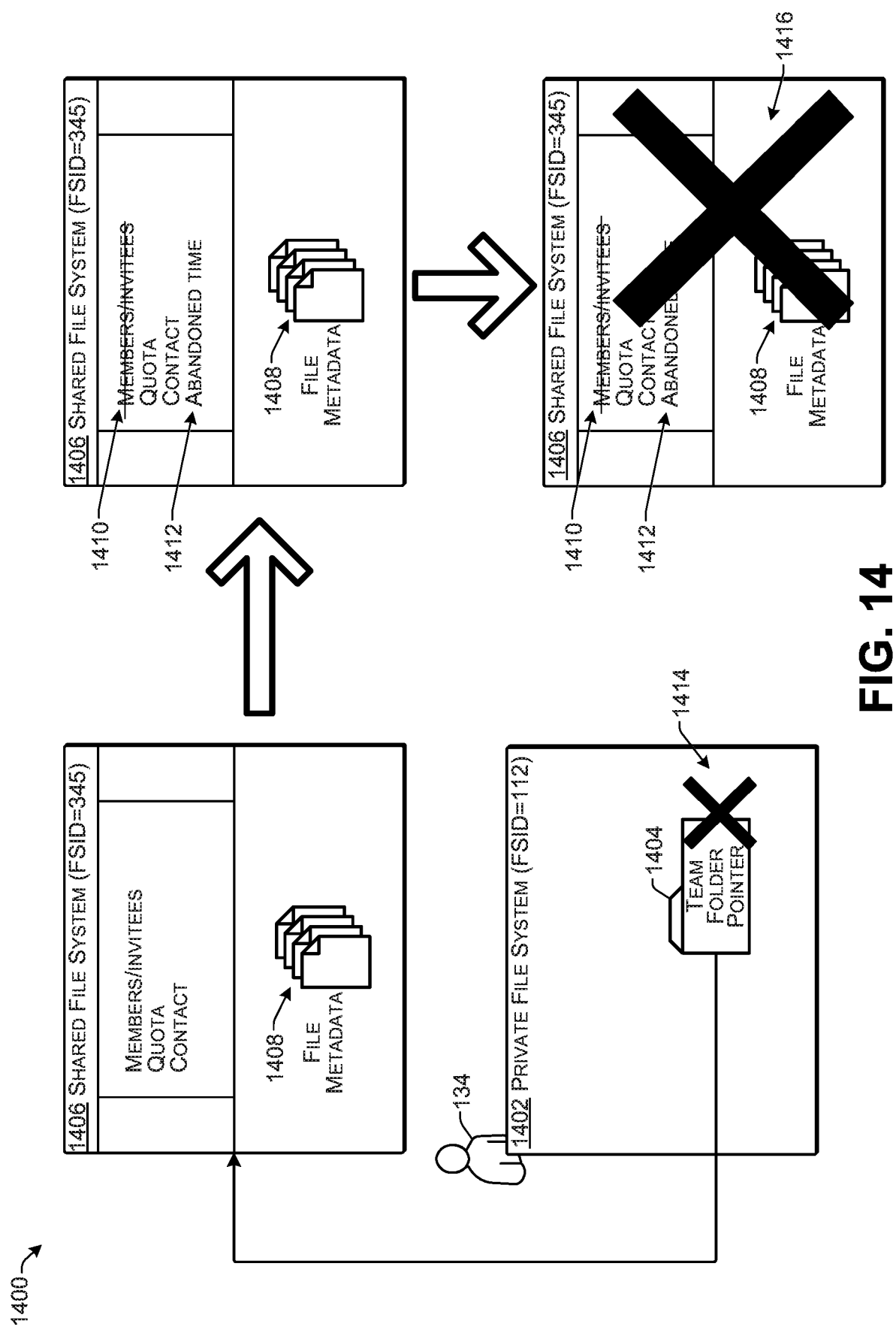
FIG. 14 is a block diagram illustrating deletion of a team folder according to some implementations.

FIG. 14 is a block diagram 1400 illustrating an example of deleting a team folder according to some implementations. Any member of a team folder having team folder administration enabled in their profile and having a specified role of manager of the team folder may delete the corresponding team folder. When a user elects to delete the team folder, all members are removed from the team folder placing the team folder into an "abandoned" state. The abandoned state still allows for an administrator to recover a team folder, such as in the case that the deletion of the team folder is accidental or malicious. An abandoned team folder may be recovered by the administrator inviting a user into the team folder with the role of manager. The folder may then resume functioning as normal with all data intact. The administrator may alternatively choose to delete manually the team folder from the backend storage in some examples. Further, in some examples, a retention policy in the computer system may be configured by an administrator to cause automatic permanent deletion of abandoned team folders after passage of a configurable period of time corresponding to the retention policy.

In this example, suppose that a user 134 has a private file system 1402 with a file system ID (FSID=112). In addition, suppose that the user's private file system 1402 has a pointer 1404 for a team folder, such as a mount record. The pointer 1404 points to the shared file system 1406 for the team folder having a file system ID (FSID=345) and including file metadata 1408. In this example, suppose that the user 134 has a manager role with respect to the team folder, and that the user has determined to delete the team folder.

To delete the team folder, the user 134 selects the team folder from a management user interface presented on the client device as discussed above with respect to FIG. 12. The user indicates to the system that the team folder is to be deleted and confirms the deletion request. In response, the system removes all members from the team folder as indicated at 1410. Further, the status of the shared file system 1406 is changed to abandoned, and an abandoned time is associated with the shared file system 1406, as indicated at 1412. Furthermore, as indicated at 1414, the system removes the pointer to the shared file system 1406 from the private file system of each member of the team folder.

Subsequently, as discussed above with respect to FIG. 13, the system may periodically evaluate the abandoned age of abandoned team folders. Consequently, after the elapse of a threshold period of time following the abandoned time, the system may permanently delete the shared file system 1406, as indicated at 1416. As an example, the permanent deletion of the shared file system may include sending, to the storage system, an indication that any files associated with the shared file system 1406, and not associated with any other file systems, are to be permanently deleted from the storage system. In addition, the system may permanently delete, from the metadata database, the metadata associated with the shared file system 1406. When a team folder has been permanently deleted, the storage capacity associated with that team folder may be returned to the team folder storage pool.

Accordingly, implementations herein provide a system, method and processor-executable instruction for enabling team folder creation. The system may receive, from a client device associated with a first user, a request to create a team folder from a folder associated with the first user, wherein the request indicates a requested storage quota to associate with the team folder from a team folder storage pool. The system may determine whether the requested storage quota is below a threshold amount corresponding to a profile for team folder creation associated with the first user. Based at least in part on determining that the requested storage quota is below the threshold amount, the system may create a shared file system for the team folder, and allocating a quantity of storage from the team folder storage pool to the shared file system based on the requested storage quota. Alternatively, based at least in part on determining that the requested storage quota exceeds the threshold amount, the system may generate a communication to an administrator computing device to ask approval for creation of the team folder.

Furthermore, if the folder associated with the first user is a private folder, then, based at least in part on determining that the requested storage quota exceeds the threshold amount, the system may convert the private folder to a shared folder by: creating a shared file system for the shared folder; allocating storage from a storage quota associated with the first user to the shared file system for the shared folder; and copying data from the private folder to the shared file system for the shared folder. Additionally, subsequent to creating the shared file system for the shared folder, the system may receive, from the administrator computing device, an approval for creation of the team folder. In response, the system may create another shared file system for the team folder, allocate a quantity of storage from the team folder storage pool to the other shared file system based on one of the requested storage quota, or a storage quota received from the administrator computing device, and copy the data from the shared file system for the shared folder to the other shared file system for the team folder.

In addition, the system may determine one or more second users to invite to access the team folder, and the system may send, to respective computing devices associated with the one or more second users, respective invitations to access the team folder. In response to receiving an acceptance from a particular second user, the system may add, to a private file system associated with the particular second user, a pointer to the shared file system for the shared folder.

Furthermore, subsequent to creating the shared file system for the shared folder, the system may receive, from the administrator computing device, an approval for creation of the team folder and the system may create another shared file system for the team folder. The system may add, to the private file system associated with the particular second user, a pointer to the other shared file system for the team folder, and remove, from the private file system associated with the particular second user, the pointer to the shared file system for the shared folder. Further, the system may determine a role specified for the particular second user, and associate, with the particular second user, the role specified for the particular second user with respect to the team folder.

In addition, if the folder associated with the first user is a private folder, and based at least in part on determining that the requested storage quota is below the threshold amount, the system may create the shared file system for the team folder and copy data from the private folder to the shared folder. The data may be metadata corresponding to one or more objects stored in a storage system, and the system may indicate that the private folder is to be deleted.

The example processes described herein are only examples of processes provided for discussion purposes. Numerous other variations may be apparent to those of skill in the art in light of the disclosure herein. Further, while the disclosure herein sets forth several examples of suitable frameworks, architectures and environments for executing the processes, implementations herein are not limited to the particular examples shown and discussed. Furthermore, this disclosure provides various example implementations, as described and as illustrated in the drawings. However, this disclosure is not limited to the implementations described and illustrated herein, but can extend to other implementations, as would be known or as would become known to those skilled in the art.

Various instructions, processes, and techniques described herein may be considered in the general context of computer-executable instructions, such as program modules stored on computer-readable media, and executed by the processor(s) herein. Generally, program modules include routines, programs, objects, components, data structures, etc., for performing particular tasks or implementing particular abstract data types. These program modules, and the like, may be executed as native code or may be downloaded and executed, such as in a virtual machine or other just-in-time compilation execution environment. Typically, the functionality of the program modules may be combined or distributed as desired in various implementations. An implementation of these modules and techniques may be stored on computer storage media or transmitted across some form of communication media.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The invention claimed is:

1. A system enabling team folder creation, the system comprising:
   a storage; and
   one or more processors coupled for communication with the storage, the one or more processors programmed by executable instructions to perform operations comprising:
   receiving, by the one or more processors, from a client device associated with a first user, a request to create a team folder from a private folder located in a private file system associated with the first user, wherein the request indicates a requested storage quota to associate with the team folder from a team folder storage pool, wherein the team folder is configured to consume a team folder storage quota assigned to the team folder from the team folder storage pool, rather than consuming a storage quota assigned to a particular user;
   determining, by the one or more processors, whether the requested storage quota is below a threshold amount corresponding to a profile for team folder creation associated with the first user;
   in response to the one or more processors determining that the requested storage quota exceeds the threshold amount, creating, by the one or more processors, a shared folder rather than the team folder by converting the private folder to the shared folder and allocating storage from a storage quota associated with the first user to the shared folder, wherein the shared folder is configured to consume the storage quota associated with the first user, rather than consuming storage from the team folder storage pool; and
   generating, by the one or more processors, a communication to an administrator computing device requesting approval for creation of the team folder of the requested storage quota from the team folder storage pool.

2. The system as recited in claim 1, the operation of converting the private folder to the shared folder further comprising:
   creating a shared file system for the shared folder;
   allocating storage from the storage quota associated with the first user to the shared file system for the shared folder; and
   copying data from the private folder to the shared file system for the shared folder.

3. The system as recited in claim 2, the operations further comprising:
   subsequent to creating the shared file system for the shared folder, receiving, from the administrator computing device, an approval for creation of the team folder;
   creating another shared file system for the team folder;
   allocating a quantity of storage from the team folder storage pool to the other shared file system based on one of:
      the requested storage quota; or
      a storage quota received from the administrator computing device;
   copying the data from the shared file system for the shared folder to the other shared file system for the team folder; and
   associating with the team folder at least one of:
      membership information indicating members of the shared folder that are able to access the team folder; or
      invitee information indicating users to invite to access the team folder.

4. The system as recited in claim 1, the operations further comprising:
   determining one or more second users to invite to access the team folder;
   sending, to respective computing devices associated with the one or more second users, respective invitations to access the team folder; and
   in response to receiving an acceptance from a particular second user, adding, to a private file system associated with the particular second user, a pointer to the shared file system for the shared folder.

5. The system as recited in claim 4, the operations further comprising:
   subsequent to creating the shared file system for the shared folder, receiving, from the administrator computing device, an approval for creation of the team folder;
   creating another shared file system for the team folder;
   adding, to the private file system associated with the particular second user, a pointer to the other shared file system for the team folder;
   removing, from the private file system associated with the particular second user, the pointer to the shared file system for the shared folder;
   determining a role specified for the particular second user; and
   associating, with the particular second user, the role specified for the particular second user with respect to the team folder.

6. The system as recited in claim 1, wherein the data is metadata corresponding to one or more objects stored in a storage system, the operations further comprising indicating the private folder is to be deleted.

7. The system as recited in claim 6, wherein the request indicates one or more second users to be invited to access the team folder, the operations further comprising:
   sending, to respective computing devices associated with the one or more second users, respective invitations to access the team folder; and
   in response to receiving an acceptance from a particular second user, adding, to a private file system associated with the particular second user, a pointer to the shared file system for the team folder.

8. The system as recited in claim 6, the operations further comprising:
   receiving, from the computing device associated with the first user, an indication that the team folder is to be deleted;
   determining one or more users associated with the team folder;
   removing, from respective private file systems associated with the determined one or more users, respective pointers to the shared file system for the team folder; and
   recording a time associated with the deletion of the team folder.

9. The system as recited in claim 8, the operations further comprising:
   determining that a threshold period of time has elapsed since the time associated with the deletion of the team folder;
   deleting the shared file system for the team folder; and sending, to a storage system, an indication that one or more objects associated with the team folder are able to be deleted from the storage system.

10. The system as recited in claim 1, the operations further comprising:
causing display, on the administrator computing device, a user interface for managing the profile for team folder creation;
receiving via the user interface an indication of a maximum storage quota threshold for a team folder created in association with the profile;
in response to receiving the request to create the team folder, determining that the first user is associated with the profile; and
determining whether the requested storage quota is below the threshold amount corresponding to the profile includes comparing the requested storage quota to the maximum storage quota threshold received via the user interface.

11. The system as recited in claim 1, the operations further comprising:
receiving, by the one or more processors, from a client device associated with a second user, a request to create a second team folder from a shared folder located in a private file system associated with the second user, wherein the request indicates a requested storage quota to associate with the second team folder from the team folder storage pool;
based at least in part on determining that the requested storage quota for the second team folder is below the threshold amount, creating a shared file system for the second team folder and copying data from the shared folder in the private file system associated with the second user to the shared file system for the second team folder, wherein the data is metadata corresponding to one or more objects stored in a storage system.

12. A method enabling team folder creation, the method comprising:
receiving, by a computing device, from a client device associated with a first user, a request to create a team folder from a folder associated with the first user, wherein the request indicates a requested storage quota to associate with the team folder from a team folder storage pool, wherein the team folder is configured to consume a team folder storage quota assigned to the team folder from the team folder storage pool, rather than consuming a storage quota assigned to a particular user;
determining, by the computing device, whether the requested storage quota is below a threshold amount corresponding to a profile for team folder creation associated with the first user;
in response to the computing device determining that the requested storage quota exceeds the threshold amount, creating, by the computing device, a shared folder rather than the team folder by converting the private folder to the shared folder and allocating storage from a storage quota associated with the first user to the shared folder, wherein the shared folder is configured to consume the storage quota associated with the first user, rather than consuming storage from the team folder storage pool; and
generating, by the computing device, a communication to an administrator computing device requesting approval for creation of the team folder of the requested storage quota from the team folder storage pool.

13. The method as recited in claim 12, wherein converting the private folder to the shared folder comprises:
creating a shared file system for the shared folder;
allocating storage from the storage quota associated with the first user to the shared file system for the shared folder; and
copying data from the private folder to the shared file system for the shared folder.

14. The method as recited in claim 13, the method further comprising:
subsequent to creating the shared file system for the shared folder, receiving, from the administrator computing device, an approval for creation of the team folder;
creating another shared file system for the team folder;
allocating a quantity of storage from the team folder storage pool to the other shared file system based on one of:
the requested storage quota; or
a storage quota received from the administrator computing device;
copying the data from the shared file system for the shared folder to the other shared file system for the team folder; and
associating with the team folder at least one of:
membership information indicating members of the shared folder that are able to access the team folder; or
invitee information indicating users to invite to access the team folder.

15. The method as recited in claim 12, further comprising:
determining one or more second users to invite to access the team folder;
sending, to respective computing devices associated with the one or more second users, respective invitations to access the team folder; and
in response to receiving an acceptance from a particular second user, adding, to a private file system associated with the particular second user, a pointer to the shared file system for the shared folder.

16. One or more non-transitory computer-readable media storing instructions that, when executed by one or more processors, program the one or more processors to:
receive, by the one or more processors, from a client device associated with a first user, a request to create a team folder from a folder associated with the first user, wherein the request indicates a requested storage quota to associate with the team folder from a team folder storage pool, wherein the team folder is configured to consume a team folder storage quota assigned to the team folder from the team folder storage pool, rather than consuming a storage quota assigned to a particular user;
determine, by the one or more processors, whether the requested storage quota is below a threshold amount corresponding to a profile for team folder creation associated with the first user;
in response to the one or more processors determining that the requested storage quota exceeds the threshold amount, create, by the one or more processors, a shared folder rather than the team folder by converting the private folder to the shared folder and allocating storage from a storage quota associated with the first user to the shared folder, wherein the shared folder is configured to consume the storage quota associated with the first user, rather than consuming storage from the team folder storage pool; and generate, by the one or more processors, a communication to an administrator computing device requesting approval for creation of the team folder of the requested storage quota from the team folder storage pool.

17. The one or more non-transitory computer-readable media as recited in claim 16, wherein converting the private folder to a shared folder comprises:
creating a shared file system for the shared folder;
allocating storage from the storage quota associated with the first user to the shared file system for the shared folder; and
copying data from the private folder to the shared file system for the shared folder.

18. The one or more non-transitory computer-readable media as recited in claim 17, wherein the one or more processors are further programmed to:
subsequent to creating the shared file system for the shared folder, receive, from the administrator computing device, an approval for creation of the team folder;
create another shared file system for the team folder;
allocate a quantity of storage from the team folder storage pool to the other shared file system based on one of:
the requested storage quota; or
a storage quota received from the administrator computing device;
copy the data from the shared file system for the shared folder to the other shared file system for the team folder; and
associate with the team folder at least one of:
membership information indicating members of the shared folder that are able to access the team folder; or
invitee information indicating users to invite to access the team folder.

19. The one or more non-transitory computer-readable media as recited in claim 16, wherein the one or more processors are further programmed to:
determine one or more second users to invite to access the team folder;
send, to respective computing devices associated with the one or more second users, respective invitations to access the team folder; and
in response to receiving an acceptance from a particular second user, add, to a private file system associated with the particular second user, a pointer to the shared file system for the shared folder.

20. The one or more non-transitory computer-readable media as recited in claim 16, wherein the data is metadata corresponding to one or more objects stored in a storage system, wherein the one or more processors are further programmed to indicate the private folder is to be deleted.

* * * * *